United States Patent
Gill

(10) Patent No.: US 11,989,577 B2
(45) Date of Patent: May 21, 2024

(54) HYPERVISOR HIBERNATION

(71) Applicant: Nutanix, Inc., San Jose, CA (US)

(72) Inventor: Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/161,091

(22) Filed: Jan. 30, 2023

(65) Prior Publication Data
US 2023/0251890 A1 Aug. 10, 2023

Related U.S. Application Data

(63) Continuation of application No. 16/778,909, filed on Jan. 31, 2020, now Pat. No. 11,593,137.

(60) Provisional application No. 62/939,573, filed on Nov. 22, 2019, provisional application No. 62/894,674, filed on Aug. 30, 2019.

(51) Int. Cl.
*G06F 9/455* (2018.01)
*G06F 9/4401* (2018.01)
*G06F 12/02* (2006.01)

(52) U.S. Cl.
CPC ........ *G06F 9/45558* (2013.01); *G06F 9/4418* (2013.01); *G06F 12/0246* (2013.01); *G06F 2009/45575* (2013.01); *G06F 2009/45583* (2013.01); *G06F 2212/7201* (2013.01)

(58) Field of Classification Search
CPC .............. G06F 9/45558; G06F 9/4418; G06F 2009/45575; G06F 9/45533; G06F 9/485; G06F 2009/4557
See application file for complete search history.

(56) References Cited

U.S. PATENT DOCUMENTS

| | | |
|---|---|---|
| 6,654,830 B1 | 11/2003 | Taylor et al. |
| 6,802,062 B1 | 10/2004 | Oyamada et al. |
| 6,807,630 B2 | 10/2004 | Lay et al. |
| 6,813,708 B2 | 11/2004 | Smith et al. |
| 6,882,795 B1 | 4/2005 | Mcmurdie et al. |
| 7,693,877 B1 | 4/2010 | Zasman |
| 8,166,477 B1 | 4/2012 | Tormasov et al. |

(Continued)

OTHER PUBLICATIONS

Non-Final Office Action for U.S. Appl. No. 17/086,393 dated Mar. 21, 2022.

(Continued)

*Primary Examiner* — Dong U Kim
(74) *Attorney, Agent, or Firm* — Vista IP Law Group, LLP

(57) ABSTRACT

Upon receiving a request to hibernate a hypervisor of a virtualization system running on a first computer, acts are carried out to capture a state of the hypervisor, where the state of the hypervisor comprises hypervisor logical resource parameters and an execution state of the hypervisor. After hibernating the hypervisor by quiescing the hypervisor and storing the state of the hypervisor into a data structure, the data structure is moved to a different location. At a later moment in time, the data structure is loaded onto a second computing machine and restored. The restore operation restores the hypervisor and all of its state, including all of the virtual machines of the hypervisor as well as all of the virtual disks and other virtual devices of the virtual machines. Differences between the first computing machine and the second computing machine are reconciled before execution of the hypervisor on the second machine.

24 Claims, 15 Drawing Sheets

(56) References Cited

U.S. PATENT DOCUMENTS

| | | | |
|---|---|---|---|
| 8,230,204 | B2 | 7/2012 | Rostampour |
| 8,549,518 | B1 | 10/2013 | Aron et al. |
| 8,601,473 | B1 | 12/2013 | Aron et al. |
| 8,607,009 | B2 | 12/2013 | Nicholas et al. |
| 8,850,130 | B1 | 9/2014 | Aron et al. |
| 8,959,323 | B2 | 2/2015 | Ganti et al. |
| 9,430,268 | B2 | 8/2016 | Hussain et al. |
| 9,552,215 | B2 | 1/2017 | Voccio et al. |
| 9,652,265 | B1 | 5/2017 | Narayanasamy et al. |
| 9,772,866 | B1 | 9/2017 | Aron et al. |
| 9,804,876 | B2 | 10/2017 | Tsirkin et al. |
| 9,940,148 | B1* | 4/2018 | Dannowski ............ G06F 8/656 |
| 10,108,517 | B1 | 10/2018 | Efremov et al. |
| 10,114,565 | B2 | 10/2018 | Nithrakashyap et al. |
| 10,860,363 | B1 | 12/2020 | Gabrielson |
| 10,901,768 | B1* | 1/2021 | Mandadi ............ H04L 41/0897 |
| 11,169,835 | B1 | 11/2021 | Duong et al. |
| 2003/0208675 | A1 | 11/2003 | Burokas et al. |
| 2004/0083355 | A1 | 4/2004 | Smith et al. |
| 2005/0060590 | A1 | 3/2005 | Bradley et al. |
| 2005/0091354 | A1 | 4/2005 | Lowell et al. |
| 2005/0160423 | A1 | 7/2005 | Bantz et al. |
| 2007/0185934 | A1 | 8/2007 | Cannon et al. |
| 2010/0037096 | A1* | 2/2010 | Bum .................. G06F 11/1446 718/1 |
| 2012/0195187 | A1 | 8/2012 | Ashihara et al. |
| 2012/0254865 | A1* | 10/2012 | Saeki ................ G06F 8/656 718/1 |
| 2013/0080814 | A1 | 3/2013 | Cong et al. |
| 2013/0138995 | A1* | 5/2013 | Sivaramakrishnan ...................... G06F 11/2043 714/E11.085 |
| 2013/0139154 | A1* | 5/2013 | Shah .................. G06F 9/45558 718/1 |
| 2013/0191354 | A1 | 7/2013 | Wilf |
| 2013/0227553 | A1 | 8/2013 | Tsirkin et al. |
| 2013/0227554 | A1 | 8/2013 | Tsirkin et al. |
| 2013/0227555 | A1 | 8/2013 | Tsirkin et al. |
| 2013/0275975 | A1* | 10/2013 | Masuda ............... G06F 9/5077 718/1 |
| 2015/0058521 | A1 | 2/2015 | Armstrong et al. |
| 2015/0058522 | A1 | 2/2015 | Armstrong et al. |
| 2015/0227192 | A1* | 8/2015 | Kruglick ............ G06F 1/3296 713/323 |
| 2016/0277308 | A1 | 9/2016 | Challa et al. |
| 2016/0283281 | A1 | 9/2016 | Antony |
| 2016/0306649 | A1* | 10/2016 | Gunti ................. G06F 9/4406 |
| 2016/0323098 | A1* | 11/2016 | Bathen ............... G06F 9/45558 |
| 2016/0344821 | A1* | 11/2016 | Khosrowpour ..... H04L 67/1029 |
| 2017/0039082 | A1 | 2/2017 | Ganesan et al. |
| 2017/0147409 | A1* | 5/2017 | Chandrakar ........ G06F 9/45541 |
| 2018/0173513 | A1 | 6/2018 | Agarwal et al. |
| 2018/0232038 | A1 | 8/2018 | Surdu et al. |
| 2018/0314706 | A1 | 11/2018 | Sirton et al. |
| 2019/0317796 | A1 | 10/2019 | Kunt et al. |
| 2020/0034250 | A1 | 1/2020 | Chandrasekaran et al. |
| 2020/0089409 | A1 | 3/2020 | Ankireddypalle et al. |
| 2020/0133706 | A1 | 4/2020 | Koehler et al. |
| 2020/0133718 | A1 | 4/2020 | Koehler et al. |
| 2020/0192690 | A1 | 6/2020 | Gupta et al. |
| 2020/0310848 | A1 | 10/2020 | Kaul |
| 2020/0319694 | A1 | 10/2020 | Mohanty et al. |
| 2021/0064408 | A1 | 3/2021 | Gill |
| 2021/0067466 | A1 | 3/2021 | Parab et al. |
| 2021/0067484 | A1 | 3/2021 | Parab et al. |
| 2021/0157620 | A1* | 5/2021 | Schütz ................ G06F 3/0664 |
| 2021/0263762 | A1 | 8/2021 | Kachare et al. |

OTHER PUBLICATIONS

"4.2 Hibernating a VM," FusionCompute.

"Hibernate your On-Demand or Reserved Liux instance," Amazon Elastic Compute Cloud, dated May 23, 2021.

Non-Final Office Action for U.S. Appl. No. 16/778,909 dated Mar. 18, 2022.

Extended European Search Report for EP Patent Appln. No. 20193502.0 dated Jan. 27, 2021.

Lee, B., "Types of Hyper-V Cluster Virtual Machine Migration," Vembu, dated Aug. 17, 2018.

"Oracle VM Windows Paravirtual (PV) Drivers 2.0: New Features," An Oracle Technical White Paper, dated Jun. 2010.

Gill, B., et al., "Technical Preview: Nutanix on AWS: Making Lift and Shift Invisible," NEXTConference, Nutanix Inc., Copyright 2019.

Devarapalli, S., et al., "Xi Clusters: Accelerate Your Hybrid Cloud Journey with Nutanix in Public Clouds," .NEXTConference, Nutanix Inc., copyright 2019.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", 14th USENIX Symposium on Networked Systems Design and Implementation, NSDI '17, (Mar. 27, 2017).

Final Office Action for U.S. Appl. No. 17/086,393 dated Jul. 14, 2022.

Notice of Allowance for U.S. Appl. No. 16/778,909 dated Aug. 12, 2022.

Notice of Allowance for U.S. Appl. No. 16/778,909 dated Sep. 21, 2022.

Min Choi et al., "Cluster computing environment supporting single system Image", Sep. 20, 2004, Cluster Computing, 2004 IEEE International Conference, San Diego CA USA.

Non-Final Office Action for U.S. Appl. No. 17/086,393 dated Mar. 31, 2023.

(56) References Cited

OTHER PUBLICATIONS

"Aviatrix Transit Architecture for Azure," Aviatrix, URL: https://read.docs.aviatrix.com/HowTos/nextgentransit_for_azure.html, date found via Google as Apr. 2, 2020.
"Aviatrix Next Gen Transit with customized SNAT and DNAT features," Aviatrix, URL: https://read.docs.aviatrix.com/HowTos/transit_snat_dnat.html, date found via Google as Jun. 19, 2019.
"Launching a Gateway," Aviatrix, URL: https://read.docs.aviatrix.com/HowTos/gateway.html, date found via Google as Jun. 24, 2017.
"NSX Public Cloud Gateway: Architecture and Modes of Deployment," VMWare, URL: https://docs.vmware.com/en/VMware-NSX-T-Data-Center/3.1/installation/GUID-E761C567-937F-4E79-A98A-DEE306B1F9EF.html, dated Feb. 5, 2021.
"Azure VMware Solution Planning and Deployment Guide," VMWare, URL: https://vmc.techzone.vmware.com/resource/avs-planning-and-deployment-guide#introduction, date found via Google as Aug. 26, 2021.
Chebaro S., "Step by Step Deploy VMware NSX with Microsoft Azure IPSEC VPN Site-to-Site," Zero to Hero End User Computing, dated Mar. 17, 2017.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Final Office Action dated Aug. 2, 2023 for U.S. Appl. No. 17/086,393.
Notice of Allowance for U.S. Appl. No. 17/086,393 dated Dec. 15, 2023.

* cited by examiner

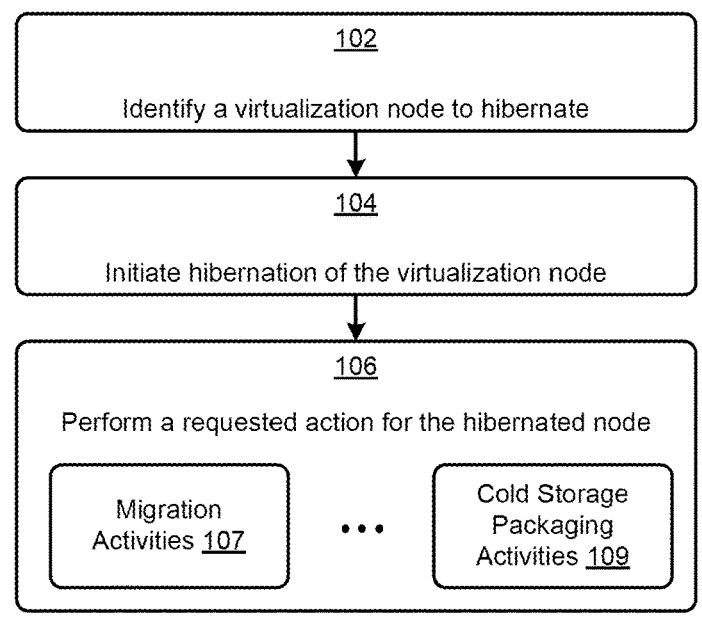
FIG. 1A1

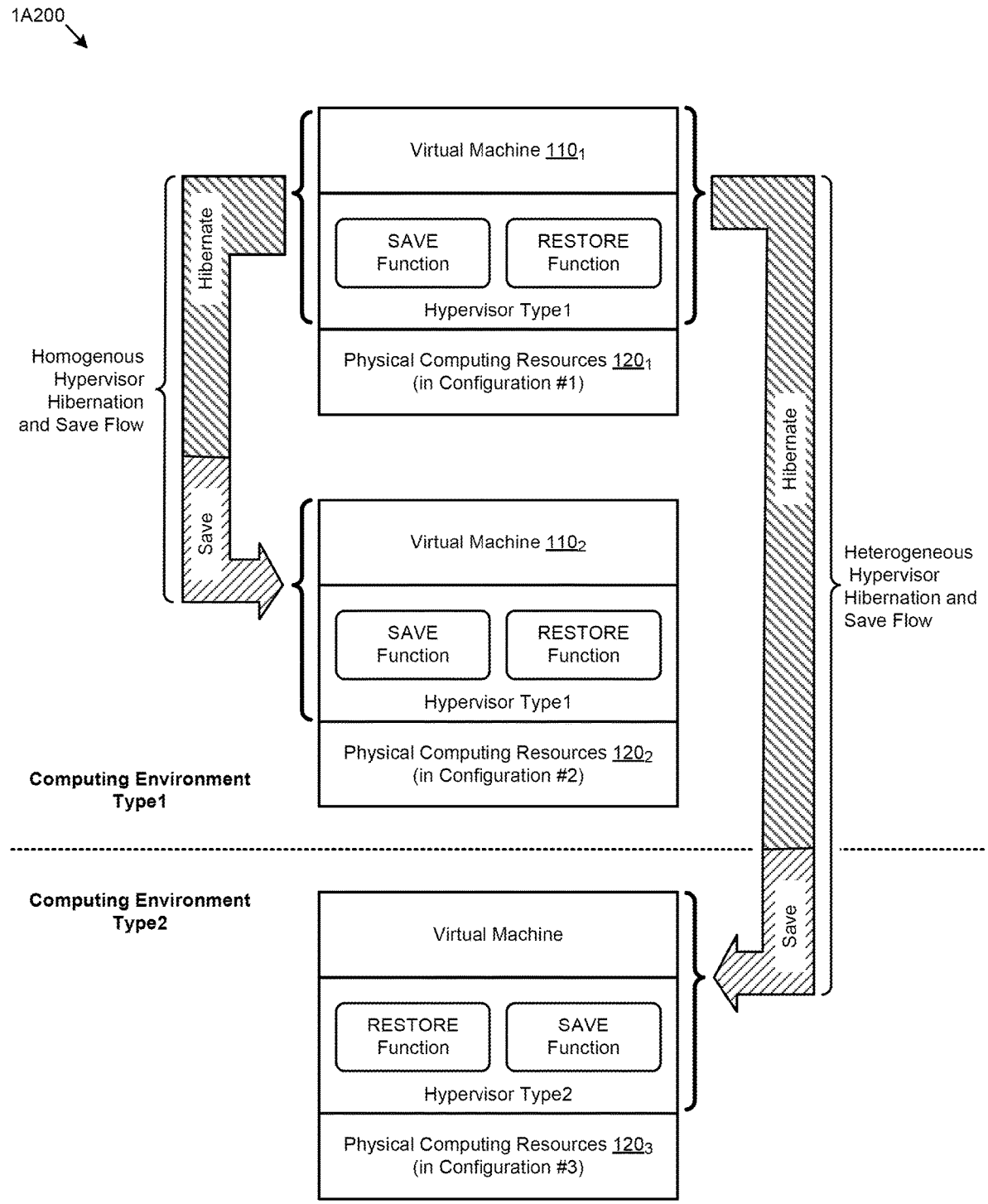
FIG. 1A2

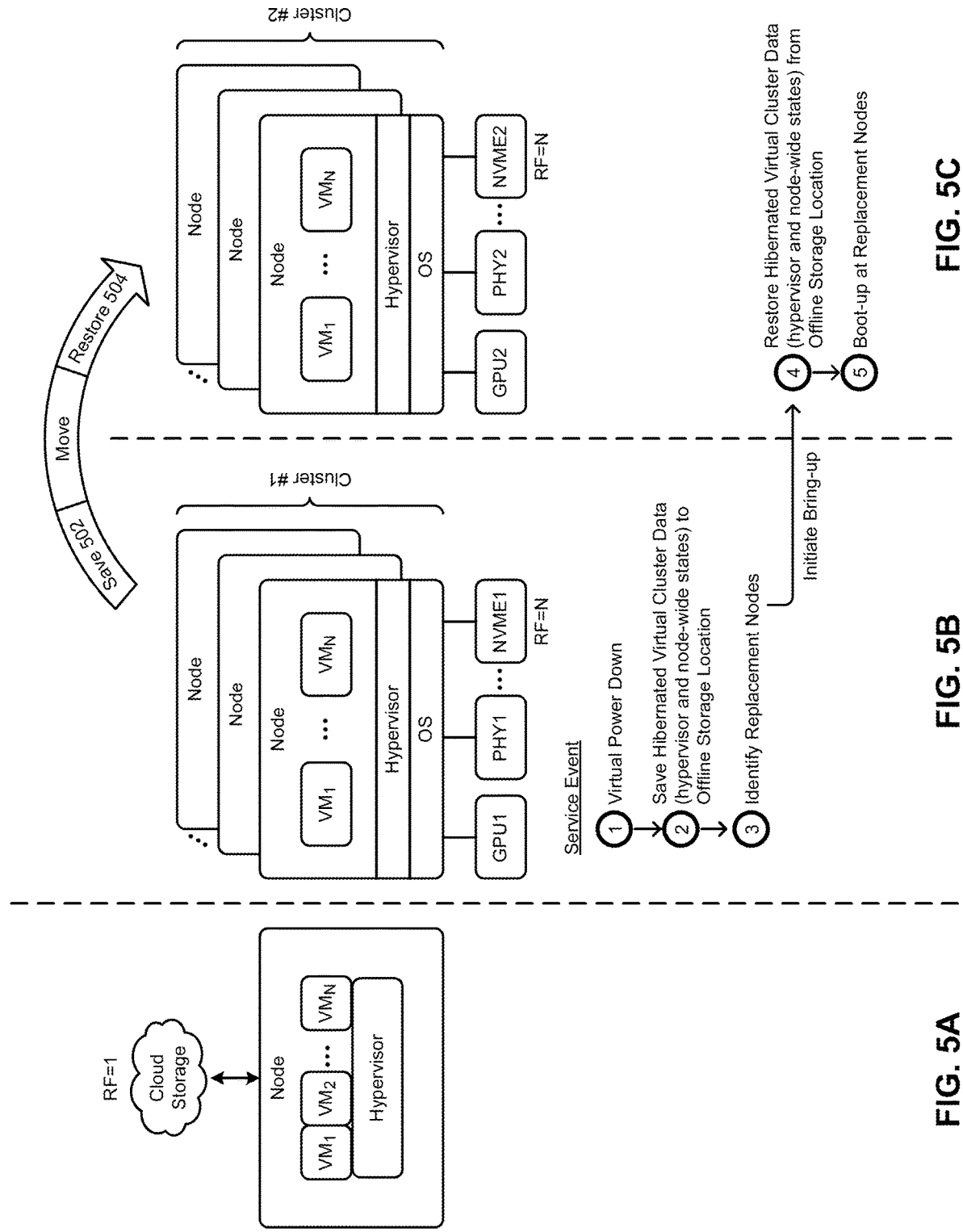

HYPERVISOR HIBERNATION

CROSS REFERENCE TO RELATED APPLICATION(S)

The present application is a continuation of U.S. application Ser. No. 16/778,909 titled "HYPERVISOR HIBERNATION", filed on Jan. 31, 2020, which claims the benefit of priority to U.S. Provisional Patent Application Ser. No. 62/939,573 titled "HYPERVISOR HIBERNATION", filed on Nov. 22, 2019 and U.S. Provisional Patent Application Ser. No. 62/894,674 titled "HYPERVISOR HIBERNATION", filed on Aug. 30, 2019; both of which are hereby incorporated by reference in their entirety.

FIELD

This disclosure relates to cloud computing, and more particularly to techniques for hypervisor hibernation.

BACKGROUND

The advent of laptop computers ushered in the concept of hibernation on a computing machine. To implement hibernation on a laptop, when the lid of a laptop is closed, a signal is received by the operating system to "enter hibernation". The operating system in turn sets about to quiesce the machine (e.g., complete any in-process device I/Os, complete any in-flight database transactions, etc.), while preserving the state of the machine in a non-volatile location such that the state can be restored at a later moment in time (e.g., when the lid of the laptop is opened). The state of the machine might include a list of running applications, and for each such running application, the state might include a corresponding running state of the application, possibly including the existence and state of any networking resources and/or the existence and state of any other computing devices. When all of the applications have signaled a quiescent state, the operating system makes final updates to the non-volatile storage area that preserves the state of the machine and then powers down the machine until such time as the lid of the laptop is raised.

Computing systems have evolved around virtualization concepts and, at least since the advent of hypervisors, computer scientists have taken advantage of the capability of migrating a virtual machine (VM) from one computing node to another computing node. In some cases, migration is desired from a first virtualization environment having a first hypervisor type or architecture to a second virtualization environment having a second hypervisor type or architecture. For example, a virtual machine can be quiesced, then its quiesced state can be copied over to the node that hosts the second hypervisor type or architecture, after which the virtual machine can then be restarted. This is analogous to the foregoing laptop hibernation in that a complete machine (or virtual machine) goes into hibernation after quiescing the activities that were running on that machine.

There are times when a particular virtualization environment, including any/all of constituent virtualized entities (e.g., virtual machines, virtual disks, etc.) are not needed for extended periods of time. One approach would be to store the state of each individual VM, and when the functionality of the virtualization environment is again needed, then reconstruct all the relevant VMs back into the state they were in before the states were stored.

Unfortunately, implementation of the foregoing approach is very complex and, moreover, the procedures for reconstruction may incur a lengthy down time. What is needed is a way to quickly migrate a virtual machine or set of virtual machines from one computing environment to another computing environment without disturbing mission-critical computing processes and/or without detracting from a user's experience.

SUMMARY

The present disclosure describes techniques used in systems, methods, and in computer program products pertaining to hypervisor hibernation, which techniques advance the relevant technologies to address technological issues with legacy approaches. More specifically, the present disclosure describes techniques used in systems, methods, and in computer program products for implementing hypervisor hibernation. Certain embodiments are directed to technological solutions for hibernating a hypervisor's states and its virtual machine(s) before moving the virtual machine(s) and their hypervisor states to a different host computing system.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 1A1 depicts a virtual node hibernation technique, according to some embodiments.

FIG. 1A2 depicts hypervisor save and restore functions, according to some embodiments.

FIG. 5A, FIG. 5B, and FIG. 5C depict environments in which virtual cluster migration using hypervisor hibernation techniques can be accomplished, according to an embodiment.

DETAILED DESCRIPTION

Figure 1B:
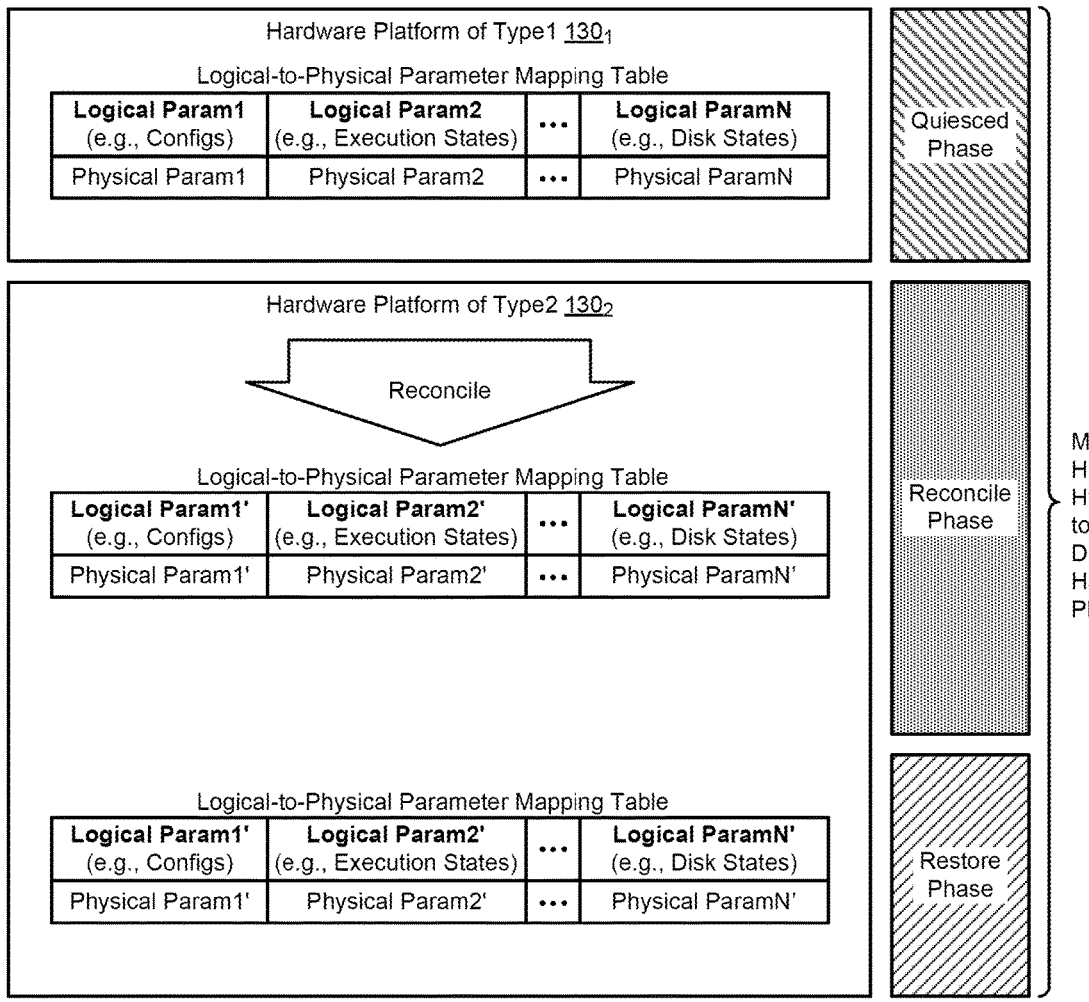
FIG. 1B depicts a logical-to-physical parameter mapping technique as used when implementing hypervisor save and restore techniques across heterogeneous hardware platforms, according to an embodiment.

Aspects of the present disclosure solve problems associated with using computer systems for moving a virtual machine and its hypervisor states to a different host computing system. Some embodiments are directed to approaches for hibernating a hypervisor and its virtual machines before moving the virtual machine and its hypervisor states to a different host computing system. The accompanying figures and discussions herein present example environments, systems, methods, and computer program products for implementing hypervisor hibernation.

OVERVIEW

Disclosed herein are techniques that, whether applied singly or in combination, serve to hibernate the state of a hypervisor on a first computing machine such that the hypervisor and all of its states, including states of any virtual machines, can be stored and then moved to a second computing machine from where it can be executed. The second computing machine can be configured differently from the first computing machine.

More specifically, after being moved to a second machine, the hibernated hypervisor and the entirety of its state can be brought-up to be able to execute on the second machine, where the bring-up corresponds to its hibernated state (e.g., as was present on the first machine at the time of hibernation). In some cases, such as when the configuration of the second machine is in some way different from the configuration of the first machine, then the bring-up on the second machine can include a bring-up phase where the hypervisor's logical view of the hardware on which it runs (i.e., the second machine) is reconciled.

Once the hypervisor's logical view of the hardware on which it runs reflects the second machine's configuration, then the hypervisor can bring up its VMs in the exact configuration that those VMs were in just before the hypervisor was hibernated. As such, the undesired approach of recording and reconstructing the complex configuration of an entire virtualization environment has been avoided by merely hibernating the hypervisor and then adjusting the hypervisor's logical view to accommodate the configuration differences between the first computing machine and the second computing machine.

In some embodiments, steps for hibernating a hypervisor include: (1) signaling a subject hypervisor to enter a quiescent state; (2) waiting for the hypervisor to reach the quiescent state; (3) capturing, in a non-volatile storage area, a set of parameters that describe a hypervisor's logical resources; and (4) capturing, in a non-volatile storage area, a set of parameters that describe a hypervisor's execution state. The hibernated hypervisor can be brought up in a different computing environment, and all of its logical resource states, including its virtual machine(s) and their state(s), can be restored such that processing can continue from the same state as was present at the time of hibernation.

In some situations, the hypervisor and/or its virtual machines may have a large data state, such as might be held in one or more virtual disks. As such, the herein-disclosed techniques include restoring a large data state-such as the contents of virtual disks and/or virtual boot devices. Some embodiments are configured to capture contents of a boot block for the hypervisor, which boot block contents can be restored at a later time. Some embodiments use a directory and a directory lookup technique to associate a physical device parameter with an object store facility that serves to retain a nonvolatile record of the states of a hypervisor's logical model of physical resources (e.g., in an in an object store format). Such a logical model of physical resources may include representations of network devices (e.g., using IP addresses, media access control (MAC) addresses, etc.), physical disk drives (e.g., via disk drive serial numbers), specialized hardware (e.g., serial numbers or other identifiers of graphical processing units), etc.

In some cases, capturing the states of network devices may include capturing a set of MAC addresses as states of a hypervisor's logical model of physical networking resources and, as such, when restoring a hibernated hypervisor to new physical hardware, a new set of MAC addresses might supersede the old MAC addresses as a result of using an address resolution protocol (ARP).

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 depicts a virtual node hibernation technique 1A100. As an option, one or more variations of virtual node hibernation technique 1A100 or any aspect thereof may be implemented in the context of the architecture and functionality of the embodiments described herein. The virtual node hibernation technique 1A100 or any aspect thereof may be implemented in any environment.

The shown flow is initiated when a request to hibernate a node is received (step 102). The request may correspond to a request to perform a migration or may correspond to a request to prepare the node for offline storage (e.g., to capture state parameters of the node to be stored in offline "cold storage"), or the request may be any other request that might demand that a hypervisor in its then-current state as well as the then-current states of any virtual machines or other virtual resources that are above the hypervisor be captured and stored in non-volatile storage. In most cases, the hibernated hypervisor, together with its state information, are stored in a node other than the node of the hibernated hypervisor. In some cases, the request refers to, or implies, a group of virtual machines and other virtual resources that are on top of the hypervisor.

The performance of the acts of hibernation (step 104) include quiescing virtual machines, capturing their states, quiescing the hypervisor, capturing its state parameter values, and then packaging the states into an object that has sufficient information to resume the hypervisor and its virtual resources at another time, possibly on a different computing platform, and possibly on a different platform that has a different configuration than the platform than hosted the hypervisor that is being subjected to hibernation.

More specifically, and as shown, the hibernated hypervisor and its virtual resources can be operated on at a later time and/or on a different computing platform (step 106) so as to (a) carry out migration activities 107 of the hibernated hypervisor and its constituents, or to (b) perform a short-term suspension, or to (c) perform long-term cold storage packaging activities 109. The format of the object that has sufficient information to resume the hypervisor and its virtual resources at another time may vary based on the intent. For example, to facilitate a bring up after a long-term hibernation, the object might be compressed and possibly stored in remote storage, whereas to facilitate a bring up after a short-term hibernation, the object might be moved around in an uncompressed form.

As shown in FIG. 1A1, the request can be a request for any one of myriad actions that are facilitated by a hypervisor hibernation. One such action pertains to migration of a virtual machine or group of virtual machines together with its hypervisor. One possible hibernation technique that is used in virtual machine (VM) migration is given in the following FIG. 1A2.

FIG. 1A2 depicts hypervisor save and restore functions 1A200. As an option, one or more variations of hypervisor save and restore functions 1A200 or any aspect thereof may be implemented in the context of the architecture and functionality of the embodiments described herein. The hypervisor save and restore functions 1A200 or any aspect thereof may be implemented in any environment.

FIG. 1A2 illustrates aspects pertaining to hibernating a hypervisor and its virtual machines before moving the virtual machine(s) and its hypervisor states to a different host computing system. Specifically, the figure is being presented with respect to its contribution to addressing the problem of moving a virtual machine (e.g., virtual machine 110i) and its hypervisor states to a different host computing system.

The embodiment shown in FIG. 1A2 is merely one example. As shown by the heterogeneous hypervisor hibernation and save transition, the hypervisor save and restore technique involves moving a hypervisor and its one or more virtual machines from a first computing environment (e.g., computing environment type1) to a second computing environment (e.g., computing environment type2), where the hypervisor type is the same, but the physical computing resources 1201 are different in at least one aspect as compared to the physical computing resources 1202.

As depicted by the homogeneous hypervisor hibernation and save flow, hypervisor states, including any states of any virtual machines running atop the hypervisor type1, can be saved (e.g., after a quiesce phase) and restored (e.g., after a migration) to a different set of physical computing resources 1201 or to the same set of physical resources in a different configuration. Any hypervisor save techniques (e.g., as implemented by the SAVE function of the hypervisor type1, as shown) and any hypervisor restore techniques (e.g., as implemented by the RESTORE function of the hypervisor type1, as shown) can be used to process any types of hardware or software states.

In some cases, a hibernated hypervisor is moved from a first set of computing resources in a first configuration to a second set of computing resources in a second configuration. As such, the acts of wake-up include reconciliation of any state parameters that could differ (e.g., differ in semantics, differ in value, etc.) between the two systems. Strictly as an example, during wake-up of a hibernated hypervisor on a second system, the IP address that was recorded in the SAVE portion of hibernate and wake-up of a node would be replaced or otherwise reconciled with the IP address of the target node on which node the RESTORE is taking place. In other situations, physical hardware characteristics of the two nodes are reconciled. For example, the physical computing resources comprising a first configuration might have 20 GB of local storage that is organized as two 10 G drives, whereas the physical computing resources of a second configuration might have 20 GB of local storage that is organized as four 5G drives. As such, the migrated virtual machine 1102 will wake-up having a different hardware configuration as compare to the hardware configuration of the environment from which it was migrated.

In some cases, it is desired that the state of a hibernated hypervisor of a first type is restarted into a hypervisor of a second type. A pathway for the heterogeneous hypervisor hibernation and save flow is shown on the right side of FIG. 1A200. In this case, the heterogeneity derives either from differences between hypervisor type1 and hypervisor type2, or from differences between the configuration of physical computing resources 1201 and the configuration of physical computing resources 1203.

In the latter situation, since the hypervisors are of different types, there is a need for further reconciliation steps to be taken. Strictly as examples, the syntax of parameter values might differ between the two hypervisors of different types. As another example, a hypervisor of a first type might refer to storage capacity in megabytes, whereas a hypervisor of a second type might refer to storage capacity in gigabytes. Accordingly, the SAVE and RESTORE functions cooperate to implement reconciliation of heterogeneous hypervisor parameters.

The foregoing supports many use cases. As examples, a hypervisor can be migrated from an on-premises (i.e., on-prem) setting to a public cloud (or vice-versa). Or a hypervisor can be migrated from a public cloud to a private cloud (or vice-versa). Or, a hypervisor can be migrated from a first on-prem setting to a second on-prem setting (or vice-versa). Moreover, there are many reasons why a hypervisor might be migrated. For example, an on-prem site might be undergoing a hardware upgrade, which would force one or more nodes of the on-prem site to be at least temporarily decommissioned. As another example, a public cloud provider might force a service interval on a tenant-forcing the tenant to move computing tasks off the node or nodes to be serviced.

In some situations, hypervisor hibernation can be chained. As such, a first hibernation from a first platform can be followed by a first wake-up at a second platform, and a second hibernation from the second platform can be followed by a second wake-up at a third platform, and so on. As depicted, the configuration of the first platform can be different from the configuration of the second platform, and so on.

FIG. 1B depicts a logical-to-physical parameter mapping technique 1B00 as used when implementing hypervisor save and restore techniques across heterogeneous hardware platforms. As an option, one or more variations of logical-to-physical parameter mapping technique 1B00 or any aspect thereof may be implemented in the context of the architecture and functionality of the embodiments described herein. The logical-to-physical parameter mapping technique 1B00 or any aspect thereof may be implemented in any environment.

FIG. 1B illustrates aspects pertaining to hibernating a hypervisor and its virtual machines before moving the virtual machine and its hypervisor states to a different host computing system, where the target host computing platform is different from the source host computing platform. Specifically, the figure is being presented with respect to its contribution to addressing the problems of quiescing and moving a virtual machine and its hypervisor states to a different type of hardware.

The embodiment shown in FIG. 1B is merely one example. The logical-to-physical parameter mapping table depicts how hypervisor logical resource parameters are mapped to a hypervisor physical resource parameters. When hibernating the states of a first hypervisor of a first type in advance of moving the states to a second hypervisor of a second type, various logical resource parameters (e.g., hypervisor parameters) pertaining to the first hardware platform of a first type (e.g., hardware platform of type1 $130_1$) are mapped to the physical resource parameters of the second hardware platform (e.g., hardware platform of type2 $130_2$). Then, when the RESTORE function is invoked, the reconciled logical parameters are restored into the hypervisor at the second hardware platform of a second type, thus recreating the state of the first hypervisor as of the time the first hypervisor was hibernated. The state of the first hypervisor as of the time the first hypervisor was hibernated may include an extensive set of configuration parameters, possibly including a list of VMs and their states, and possibly including any interrelationships between the listed VM. In many cases, every virtual machine parameter of every virtual resource of any given VM are saved (and restored) as well.

The shown state parameters (i.e., "Configs", "Execution States", and "Disk States") are purely illustrative and other parameters are possible. Strictly as examples, virtual resources of any given VM may include media access control addresses, virtual network interfaces, virtual network sockets, virtual disks, virtual memory images, etc.

During execution of certain operations of a RESTORE function, the sizes and configurations of the virtual resources are checked against available resources. In any event, where the size and/or configuration of a virtual resources is incompatible (e.g., oversized) with physical resources at the target platform, the user is informed. In some cases, even if a physical disk storage device detected in the RESTORE function is, for example, smaller than the corresponding physical disk storage device as detected in the SAVE function, the smaller disk storage device might still be suitable. This is because, although a particular physical disk may serve as actual physical storage to correspond to any number of virtual disks, a given virtual disk that is mapped to the particular physical disk might only be using a portion of the capacity of the physical storage of the particular physical disk device. Similarly, although real semiconductor memory serves as actual physical memory, a particular virtual memory mapping might only be mapped onto a portion of the memory space of the real semiconductor memory.

Mapping a virtual device onto a physical device offers many advantages when migrating. Specifically, rather than performing a physical-device-to-physical-device migration, which might require very significant computing and network resources (e.g., to copy an entire large disk drive to another large disk drive on a different hardware node), performing a virtual-device-to-virtual-device migration can use computing and networking resources more efficiently since the hypervisor keeps track of the precise resource usage of virtual devices and, thus, only the actually in-use resources (e.g., actually in-use virtual disk data or actually in-use virtual memory data) need be saved and migrated.

In one embodiment, this is achieved by copying out all of the logical files in the filesystem that had been created by the hypervisor to store a particular VM's logical data. As an example, a block-level storage device capacity could be much larger than the logical files in the filesystem that are stored on the block-level storage device, hence, saving and moving only the logical files and other logically valid data is far more efficient than saving and moving all bytes of the block-level storage device. In some embodiments, the aforementioned block-level storage device is a logical construction that is presented as a single range of contiguous storage blocks, even though the block device may be composed of multiple physical storage devices. In such cases, it can happen that the logical construction of a block-level storage device might be ignorant of any filesystem or files present on the physical devices.

The foregoing advantage is evident especially in public cloud settings, where the public cloud provider has no choice but to copy over bit-by-bit all of the contents and configuration of any resource to be migrated.

The foregoing discusses the case where a hibernated hypervisor, together with its configuration, execution, and resource states are restored to a different hardware platform. The foregoing technique can be used in combination with the techniques of FIG. 1C, where a hibernated hypervisor of a first type, together with its configuration, execution, and resource states are restored to a hypervisor of a second type.

Figure 1C:
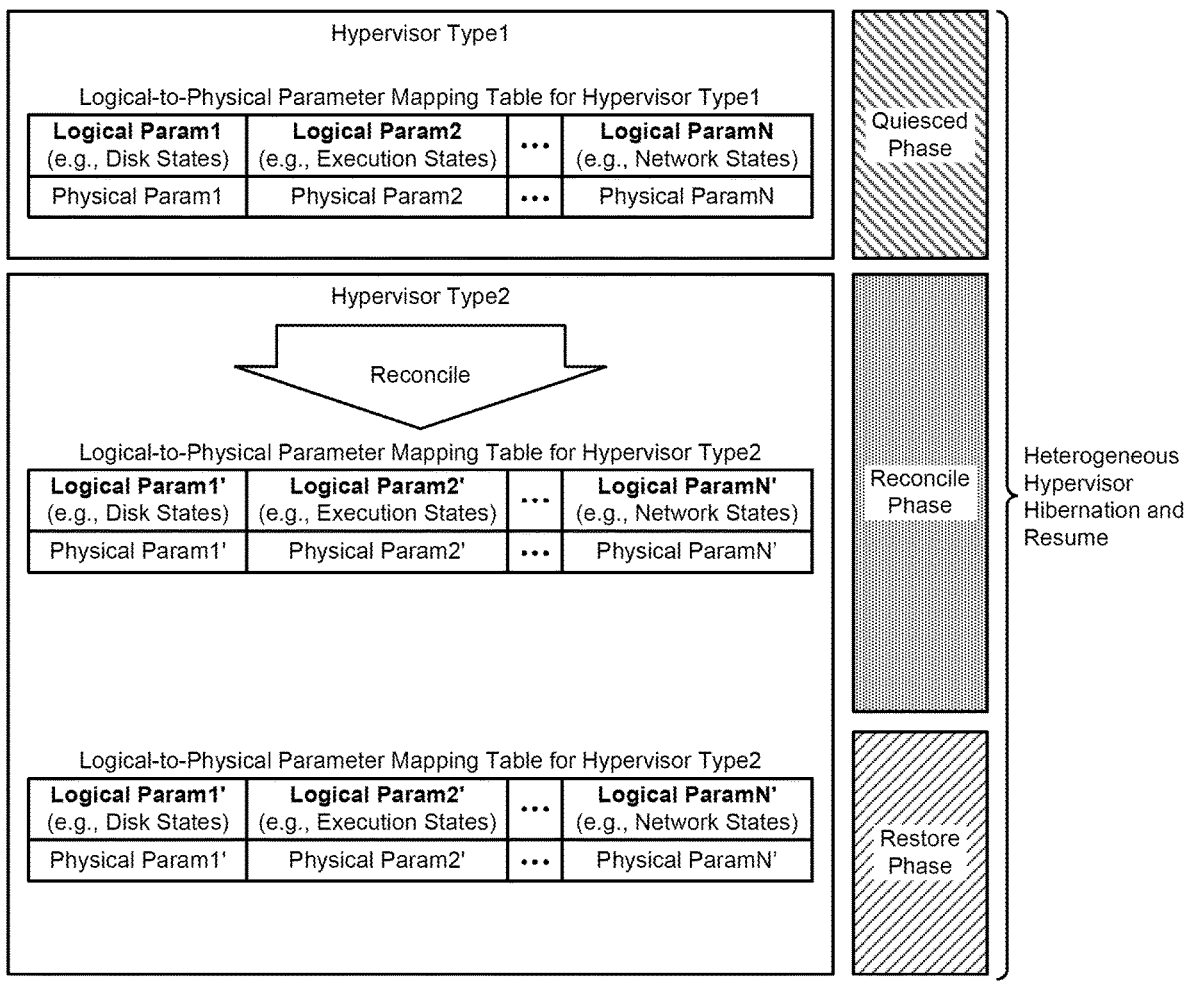
FIG. 1C depicts a hypervisor parameter reconciliation technique as used when implementing hypervisor save and restore techniques across heterogenous hypervisor platforms, according to an embodiment.

FIG. 1C depicts a hypervisor parameter reconciliation technique 1C00 as used when implementing hypervisor save and restore techniques across heterogenous hypervisors platforms. As an option, one or more variations of hypervisor parameter reconciliation technique 1C00 or any aspect thereof may be implemented in the context of the architecture and functionality of the embodiments described herein. The hypervisor parameter reconciliation technique 1C00 or any aspect thereof may be implemented in any environment.

FIG. 1C illustrates aspects pertaining to hibernating a hypervisor and its virtual machines before moving the virtual machine and its hypervisor states to a different host computing system. Specifically, the figure is being presented with respect to its contribution to addressing the problems of quiescing and moving a virtual machine and its hypervisor states to a different type of hypervisor.

The embodiment shown in FIG. 1C is merely one example. The hypervisor parameter reconciliation technique depicts how logical parameters are mapped to physical parameters. When hibernating a first hypervisor of a first type in advance of moving the states to a second hypervisor of a second type, various logical parameters pertaining to the first hypervisor type are mapped to physical parameters of the second hypervisor. Then, when the RESTORE function of the second hypervisor is invoked, the reconciled logical parameters are restored into the second hypervisor, thus recreating the state of the first hypervisor as of the time the first hypervisor was hibernated.

Figure 2A:
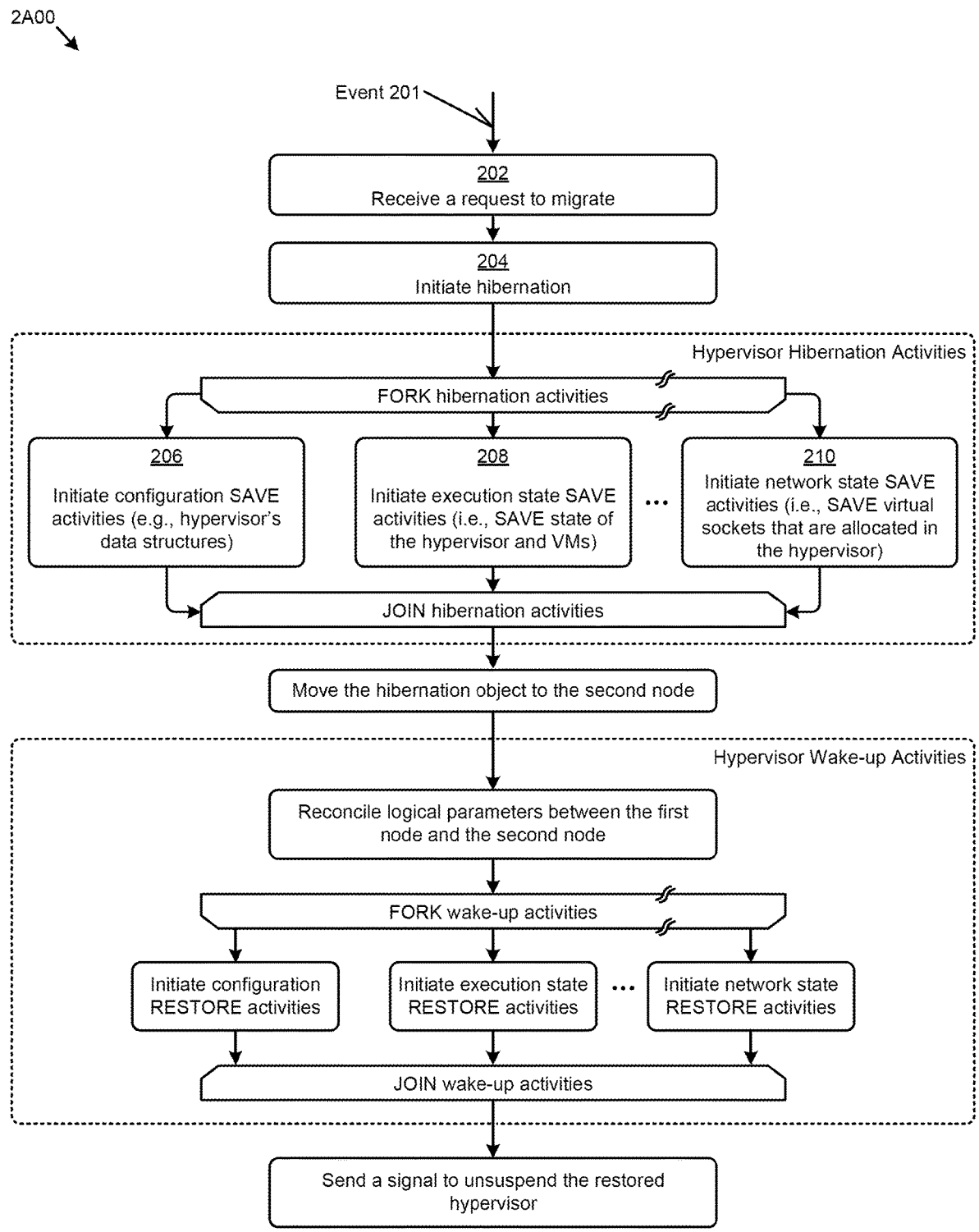
FIG. 2A is a processing flow as used to accomplish hypervisor hibernation for virtual node migration, according to an embodiment.

FIG. 2A is a processing flow 2A00 as used to accomplish hypervisor hibernation for virtual node migration. As an option, one or more variations of processing flow 2A00 or any aspect thereof may be implemented in the context of the architecture and functionality of the embodiments described herein. The processing flow 2A00 or any aspect thereof may be implemented in any environment.

FIG. 2A illustrates aspects pertaining to hibernating a hypervisor and its virtual machine(s) before moving the virtual machine states and hypervisor states to a different host computing system. The embodiment shown in FIG. 2A is merely one example. As shown, processing flow 2A00 commences upon occurrence of a trigger or event 201, at which time the processing flow receives a request to migrate (step 202) (e.g., to migrate one or more virtual machines from a first node to a second node). Step 204 serves to initiate hibernations, which causes spawning of a plurality of concurrent processing activities. In the example shown, a to-be-hibernated hypervisor's configuration data structures are saved (step 206), while concurrently the states of the virtual machines running atop the hypervisor are captured (step 208) while, concurrently, the data structures of the hypervisor that correspond to virtual networking devices are captured (step 210).

In some embodiments, VMs are suspended prior to invoking hypervisor hibernation activities, while in other embodiments, the VMs are permitted to continue to run while data of the virtual disks of respective VMs are captured. In some cases, such as when VMs are permitted to continue to run while data of the virtual disks of respective VMs are captured, the VM is suspended only after all of the then-current vDisk data has been captured and packaged in association with the other captured states of the hypervisor or virtual machines.

When the hypervisor hibernation activities have completed, then the hibernated hypervisor, with all of its states of all of its virtual resources can be moved, at which point the differences in parameters or parameter values between the two systems can be addressed. After movement of the states to the second hypervisor, hypervisor wake-up activities can be initiated and, when those activities have completed, the second hypervisor can be signaled to unsuspend.

The foregoing processing flow 2A00 is merely one example. Various cases arise where, during the SAVE actions of the hypervisor hibernation activities, certain parameters are necessarily saved before other parameters. There are also various cases where, during the RESTORE actions of the hypervisor wake-up activities, certain parameters are necessarily restored before other parameters. To accommodate dependencies as pertain to parameters that need to be saved and/or restored in a particular order, a map and dependency chart is provided. In most cases, such a map and dependency chart can be formed dynamically. As an illustrative case, when multiple interrelated VMs are quiesced during a SAVE, those VMs are quiesced in a particular order that derives from their subordination. When the RESTORE takes place, those quiesced VMs are started-up in the reverse order as was employed during the SAVE.

While the foregoing describes use of hypervisor hibernation to accomplish VM migration, it is merely one example. Other reasons or causes (e.g., packaging a hypervisor for long-term cold storage packaging) may give rise to initiation of hypervisor hibernation.

Figure 2B:
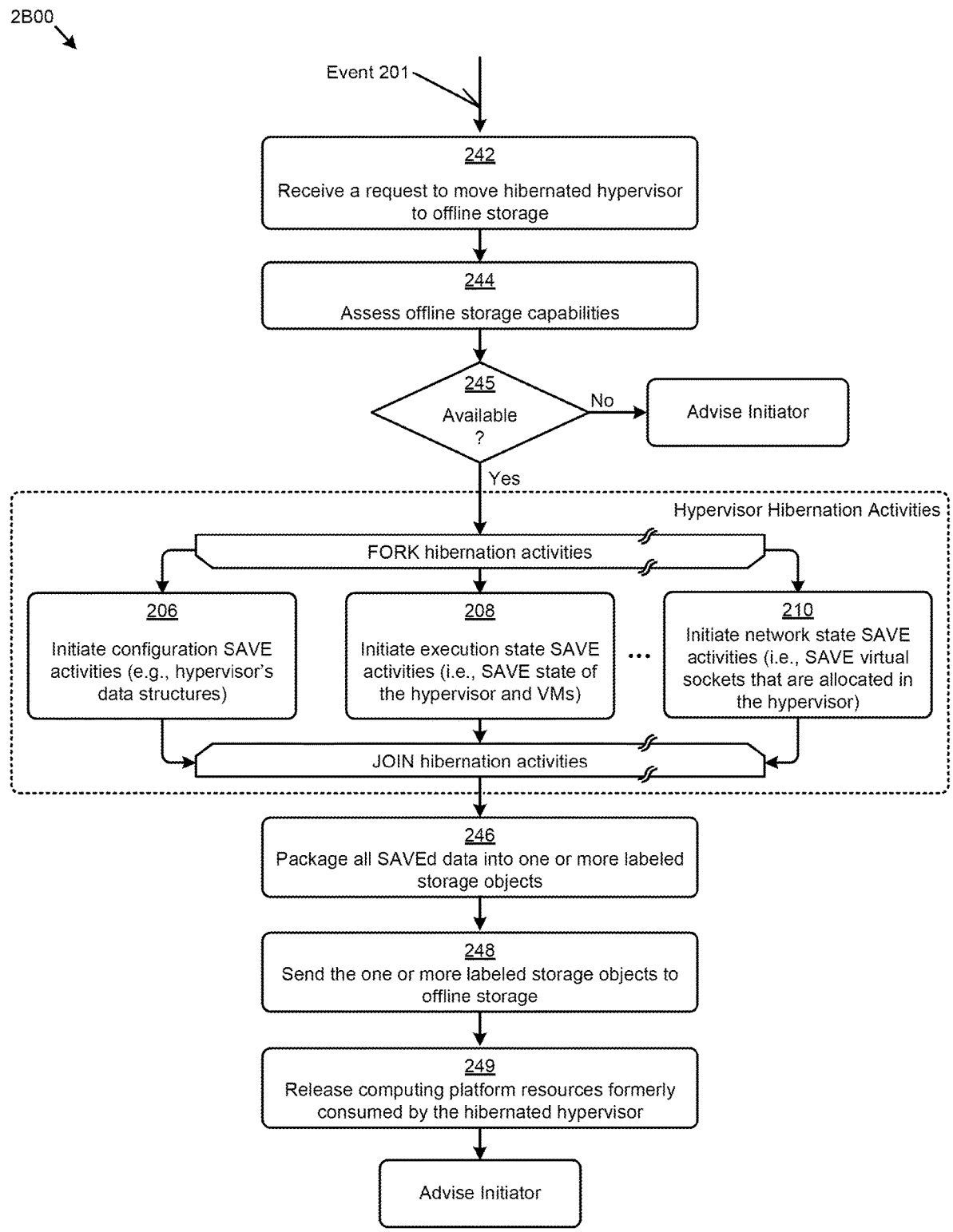
FIG. 2B is a processing flow as used to accomplish hypervisor hibernation for cold storage of a virtual node, according to an embodiment.

FIG. 2B is a processing flow 2B00 as used to accomplish hypervisor hibernation for cold storage of a virtual node. As shown, processing flow 2B00 commences upon occurrence of a trigger or event 201. In some cases, the event is a request to hibernate a hypervisor (step 242) for long-term storage (e.g., days, weeks, months, etc.) at an offline storage service for temporary nonvolatile preservation. The offline storage service can accept data structures in any convenient or applicable format (e.g., in a block-level format, or in an object storage format). In doing so, a tenant (e.g., tenant of a public cloud service) can offload the computing node from the computing task, and thus can reduce or eliminate costs associated with tenancy of the computing resource. In most cases, the costs of some extent of "cold" storage resources (e.g., object storage) is much less than the cost of tenancy of a computing resource. Accordingly, if the computing task is, for whatever reason, unneeded for some duration of time, it can be hibernated, packaged (e.g., into a cold storage object), and stored indefinitely.

The amount of offline storage needed, and the availability of suitable offline storage facilities, can be assessed (step 244) and if there are sufficient suitable offline storage facilities available for storage (decision 245) of the packaged virtual node, then processing proceeds to the shown hypervisor hibernation activities. When the virtual node hibernation activities complete then, at step 246, the saved data is packaged into labeled storage objects. The labeling of the storage objects facilitates later restoration. For example, inasmuch as there is a logical progression in bring-up and wake-up activities, various components might be packaged and labeled accordingly. As one specific labeling example, the boot blocks of a boot disk of the hibernated node might be labeled as "Uncompressed Boot Disk".

Once packaged and labeled, at step 248 the package constituting the hibernated virtual node can be delivered to the offline storage facility or otherwise stored in offline storage, and thereafter, computing resources that were formerly consumed by the constituents of the virtual node can be released (step 249), thus relieving the tenant from ongoing costs that would have derived from tenancy of the computing hardware. The foregoing offline storage facility can be accessed over a network connection, possibly as a web service or possibly via an API.

The foregoing discussion of FIG. 2B covers hibernation of a virtual node. One part of the processes involved in hibernation of a virtual node is hibernation of a hypervisor itself. One possible hypervisor hibernation technique is shown and described as pertains to FIG. 3.

Figure 3:
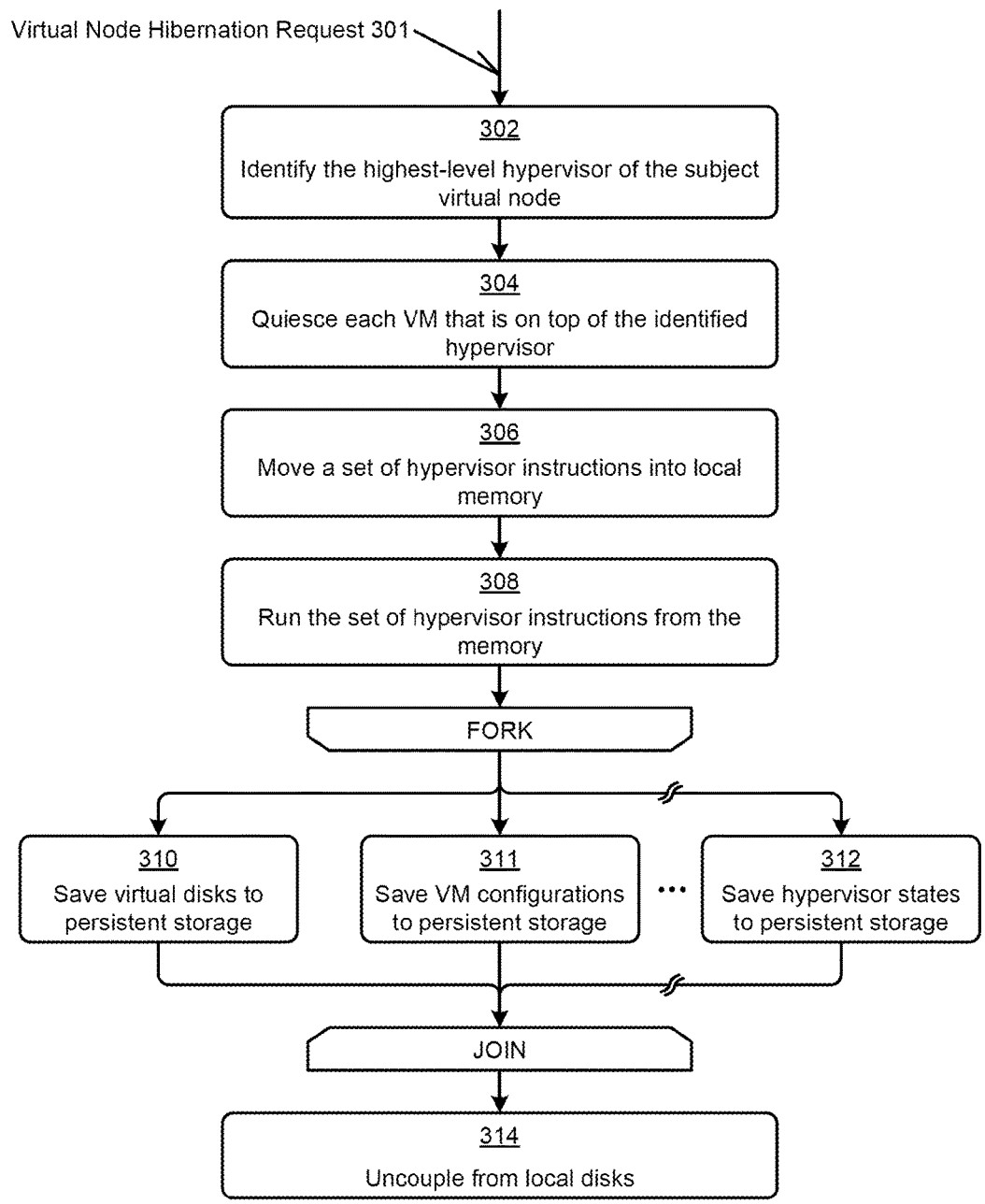
FIG. 3 depicts a hypervisor hibernation technique, according to an embodiment.

FIG. 3 depicts a hypervisor hibernation technique 300. As an option, one or more variations of hypervisor hibernation technique 300 or any aspect thereof may be implemented in the context of the architecture and functionality of the embodiments described herein. The hypervisor hibernation technique 300 or any aspect thereof may be implemented in any environment.

As shown, the hypervisor hibernation technique commences upon occurrence of a virtual node hibernation request 301, at which time step 302 serves to identify the highest-level hypervisor of the subject node. That is, although it is common for only one hypervisor to be operating on a particular virtual node, it is possible that a virtual node hosts nested hypervisors, where a nested hypervisor runs as a virtual machine on top of the node's highest-level hypervisor. As such, the highest-level hypervisor to be hibernated is identified.

Having identified the highest-level hypervisor, beginning at step 304, each VM that is on top of the identified hypervisor is quiesced. At this point, the VMs have been or can be unmounted from their storage; however, the hypervisor is still running from a boot device. To bring the hypervisor to a state where it can be unmounted from disk devices, including the boot device, a set of instructions of the hypervisor (or agent) is paged into memory (step 306). While running from the paged-in set of instructions (step 308), the hypervisor saves virtual disk storage of the VMs (step 310), saves VM configuration data (step 311), and saves hypervisor state information to persistent storage (step 312). Any or all of step 310, step 311, and step 312 can be forked to execute in parallel. At some point the forked processes or threads can be joined, at which time the persistently saved data can be closed (e.g., close any open files) and marked as ready to be moved to another node. Since the hypervisor runs from this paged-in set of instructions, the hypervisor can release its mount points on any storage devices, including the virtual node's boot device (step 314).

Figure 4:
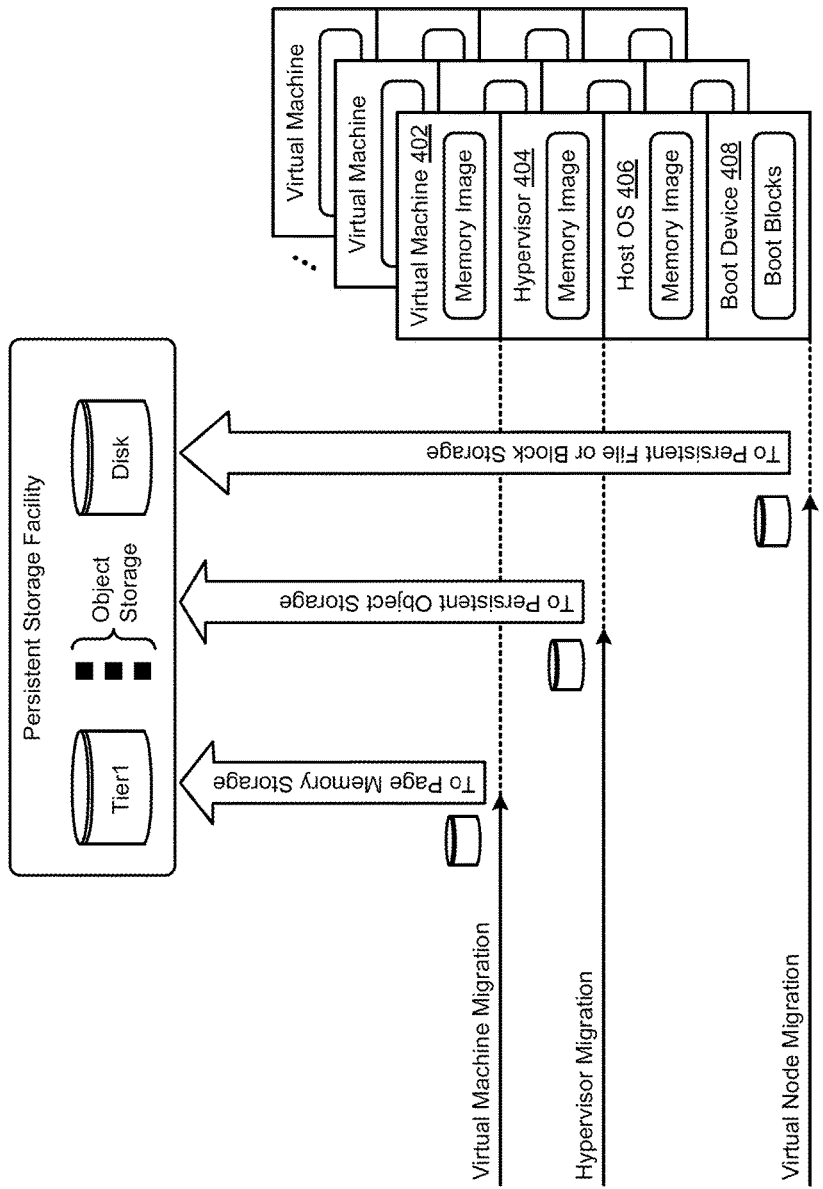
FIG. 4 depicts a set of alternative virtual object hibernation scenarios, according to an embodiment.

FIG. 4 depicts a set of alternative virtual object hibernation scenarios. The figure depicts three levels of migration, specifically virtual node migration, hypervisor migration, and virtual machine migration. Additionally, the figure depicts a boot disk.

The figure serves as an illustration of the different types of hibernation and how they interrelate. Specifically, in a first use case involving virtual node migration, the use model includes hibernation of the operating system, plus its hypervisor, plus the VMs of the hypervisor, whereas in a second use case involving hypervisor migration, the use model includes hibernation of the hypervisor plus the VMs of the hypervisor. The third use case regards migration of virtual machines.

General approaches to VM migration are described in U.S. patent application Ser. No. 16/176,653 titled "VIRTUAL MACHINE MIGRATION TASK MANAGEMENT", filed on Oct. 31, 2018, and further described in U.S. patent application Ser. No. 16/177,142 titled "ASYNCHRONOUS WORKLOAD MIGRATION CONTROL", filed on Oct. 31, 2018, both of which are hereby incorporated by reference in their entirety.

General approaches to VM migration in virtualized systems are described in U.S. patent application Ser. No. 16/778,725 titled "HANDLING IP NETWORK ADDRESSES IN A VIRTUALIZATION SYSTEM", filed on even date herewith, and in U.S. patent application Ser. No. 16/778,754 titled "VIRTUAL MACHINE MIGRATION IN CLOUD INFRASTRUCTURE NETWORKS", filed on even date herewith, both of which are hereby incorporated by reference in its entirety.

The use case itself (e.g., to migrate a virtual node, to migrate a hypervisor, to preserve into offline storage a virtual node, etc.) determines, at least in part, the level at which the hibernation activities are to commence. To illustrate, when an entire virtual node is to be migrated, the information to be saved reaches down to the bottom of the shown hierarchy such that the state of the host OS 406, including its boot device 408 as well as its hypervisor 404 and all virtual machines 402 are subjected to state capture and packaging for later restoration. Different types of storage might be employed to capture different states. As examples, data of a boot device might be stored as uncompressed block storage in the cloud, whereas data of a virtual disk of a hypervisor and its virtual machine might be stored (e.g., for cost reasons) as objects in cloud storage.

In some cases, data is stored in a particular format for performance reasons. As one example, data of any sort pertaining to a virtual machine might be stored in a "Tier1" storage for fast saving and restoration of a migrated VM. In some cases, data is stored a particular format for functional reasons. As one example, data of a boot block that comprises processor instructions might be stored as a block of data that is accessible with a logical block offset. In some cases, data is stored in a particular format for cost reasons. As one example, data of the virtual disks of a virtual machine might be stored in a compressed object format.

As depicted, a migration at any level can include multiple nodes. Moreover, migration at any level can include migration of quiesced components and/or migration of running components. In the latter case, sometimes referred to as "live migration," a node and any of its constituents (e.g., operating system, hypervisor, VMs, physical devices) can be merely checkpointed and allowed to continue to run. This technique of live migration is often used when the data state of a node is large, and as such the time needed to move the large data state would be considered downtime. In implementing the alternative of live migration, steps for migration might include: (1) quiescing virtual machines only long enough for a state snapshot to be written to disk in a consistent state, (2) unquiescing the virtual machines so as to allow the unquiesced virtual machines to continue to run and change state, (3) moving the state snapshot to a target node, (4) hibernating the hypervisor and/or other constituent computing entities at the source node, (5) moving the hibernated hypervisor to the target node, and (6) resuming the hypervisor at the target node.

Further details regarding general approaches forming snapshots that are in a consistent state are described in U.S. Publication No. 2020-0034250 titled "SAVING AND RESTORING STORAGE DEVICES USING APPLICATION-CONSISTENT SNAPSHOTS", published on Jan. 30, 2020, which is hereby incorporated by reference in its entirety.

As depicted, a migration at any level can include multiple nodes. One use case for migrating multiple nodes is for migration of an entire computing cluster. Techniques for virtual cluster migration are shown and discussed as pertains to the following figures.

FIG. 5A, FIG. 5B, and FIG. 5C, depict environments in which virtual cluster migration using hypervisor hibernation techniques can be accomplished.

One drawback of public cloud environments is its lack of built-in resilience. For example, a node in a public cloud can support a hypervisor and any number of virtual machines (e.g., $VM_1$, $VM_2$, . . . $VM_N$), however there is no built-in resilience. In most cases, while public cloud purveyors offer a platform-as-a-service, in doing so, they leave certain needed capabilities to the responsibility of the tenants. One such needed capability is data replication. Data replication is not built in to the platform-as-a-service. Instead, the cloud provider offers external "net storage." Although net storage tends to be reliable, it suffers from very slow recovery times in the event of lost data. What is needed is a way to easily provide data replication to a tenant. One way to do so is to deploy a computing cluster with, for example at least three nodes.

In a clustered environment such as is depicted by FIG. 5B, each node is configured with a computing platform that includes a host operating system, a hypervisor, and any number of VMs. The computing platform might also include specialized hardware such as a graphics processing unit (GPU1), a complement of physical access devices (PHY1), and access to high-performance storage. This arrangement serves a wide range of needs for tenants. In particular, a single tenant who elects to deploy a clustered virtualization system can now have built-in data resilience that is provided by the operation of the virtual cluster.

This data resilience by the virtual cluster is shown in FIG. 5B as "RF=N", where N is >1. However, this platform-as-a-service still suffers from periodic "down time" that occurs whenever the platform-as-a-service purveyor (e.g., cloud provider) deems it to be time to call a service interval. When a service interval is called, the tenant is expected to relinquish all resources within a short, very limited period of time. If the tenant does not relinquish all resources within the time limit, the platform-as-a-service provider will nevertheless take over the resources. This can have extremely deleterious effect on the tenant and/or the tenant's business, and as such is to be avoided.

One way to avoid the aforementioned deleterious effects is to migrate the entire virtual machine within the prescribed time limit. This can be accomplished through the shown operations. At the moment in time that the platform-as-a-service provider calls a service interval, a signal will be sent to each node. In most cases the signal is received by the host operating system, which in turn will send a "soft" power down signal to all running processes (operation 1). Since a hypervisor is a running process on top of the host OS, the hypervisor can send a "soft" power down signal to all virtual machines under the hypervisor's control. When the virtual machines have powered down (e.g., they have quiesced or exited completely), then a virtual node hibernation can begin (operation 2).

In the context of a service interval, the platform-as-a-service purveyor has available alternative hardware such that the tenant is not left "homeless". Instead, the platform-as-a-service provider offers an API call that returns the identity (node name) and addressing (IP and MAC addresses) of a replacement node to the API caller. As such, replacement nodes can be quickly identified (operation 3). Having saved the states of the virtual cluster data (operation 2) and having identified replacement nodes (operation 3), the cluster is in a state to be moved to the replacement nodes and restored. This is shown by the path from cluster #1 of FIG. 5B to cluster #2 of FIG. 5C.

At some moment after completion of operation 2 and operation 3, virtual cluster #1 is staged for restoration at the replacement nodes. Thus, at any moment in time, bring-up of cluster #2 can begin by restoring the hibernated virtual cluster data at the replacement nodes (operation 4). In some embodiments, further API calls are provided by the platform-as-a-service provider so as to facilitate bring-up at a replacement node. For example, an API call that returns the identity and addressing of a replacement node might have a companion API that accepts the location of a boot device for the replacement node. Once the executables (e.g., operating system, hypervisor, agents, etc.) are staged and once the data (configuration data, vDisk data, etc.) is in place, a boot-up at each of the replacement nodes can commence (operation 5).

The foregoing provides an overview of a save (FIG. 5B) and restore (FIG. 5C) of a virtual cluster. Techniques for cluster-wide save 502 are provided in FIG. 6A. Techniques for cluster-wide restore 504 are provided in FIG. 6D.

Figure 6A:
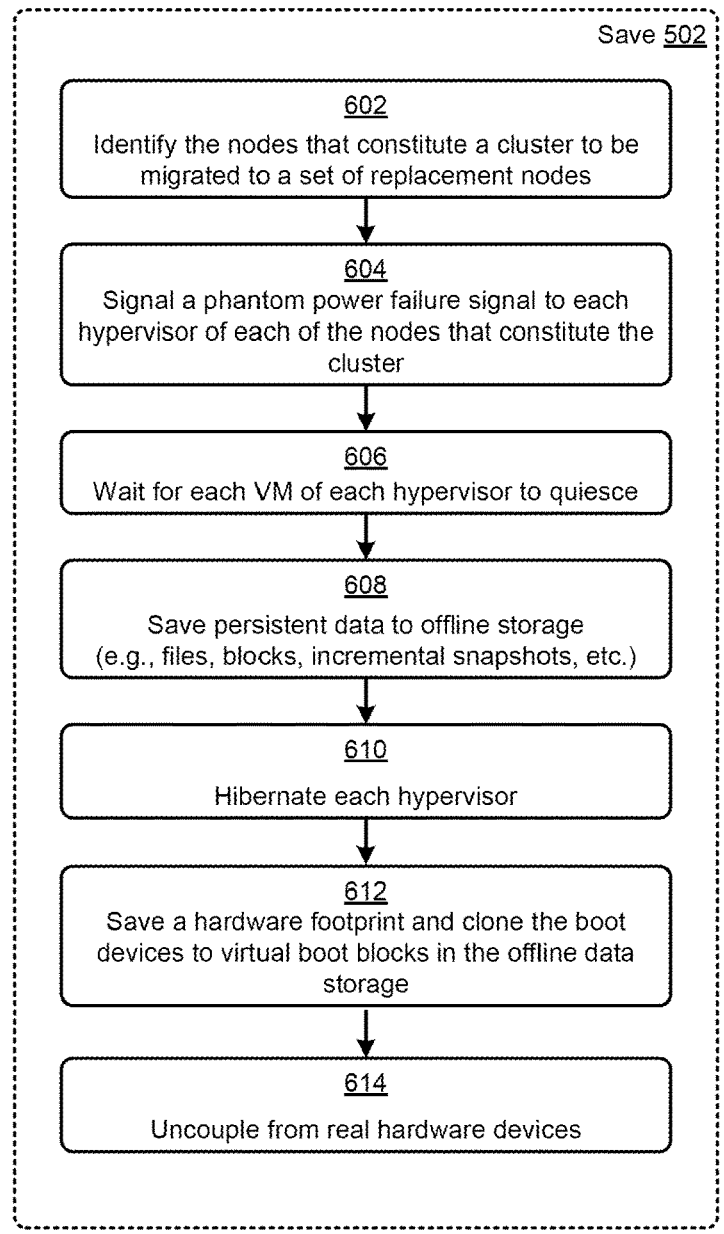
FIG. 6A presents a cluster-wide migration flow using hypervisor save techniques, according to an embodiment.

FIG. 6A presents a cluster-wide migration flow 6A00 using hypervisor save techniques. The shown flow begins with enumeration or other identification of the virtual nodes of the virtual cluster (step 602), and the shown flow ends when the virtual cluster has been quiesced, hibernated, and decoupled from the real hardware (step 614).

The identification of the nodes of a cluster can be performed by any known technique. In some embodiments, configuration data for a virtual computing cluster is maintained in a resilient database. In other embodiments, configuration data for a virtual computing cluster is maintained in a central repository in a node separate from any of the nodes of the virtual cluster.

Each node of the virtual cluster is capable of receiving a power failure signal. At the time that a virtual cluster migration is indicated (e.g., when the platform-as-a-service signals a service interval), each node receives such a signal (step 604), which signal reaches each hypervisor on each node of the virtual cluster. The hypervisor in turn signals each VM to quiesce, and the hypervisor of each node waits for each VM under the hypervisor's control to complete its quiesce procedure (step 606). In this context, a power failure quiesce procedure might be significantly faster than other quiesce procedures. Specifically, in a power failure procedure, transactions might be aborted and marked as aborted in a journal rather than completing a transaction as might happen in other quiesce procedures.

In addition to or rather than quiescing the VMs flushing their data and bringing their processing to a halt, some configurations merely pause or suspend the VM to some known execution state, and at that time perform a memory copy of the memory allocated to the VM, which memory copy is saved to persistent storage for use in restoration at the replacement nodes.

Additionally or alternatively, rather than performing a memory copy of the entire memory allocated to the VM, only those portions of the memory that are actually in use is saved to persistent storage for use in restoration at the replacement nodes. For example, malloc( ) memory that has not been written to by the VM need not be persisted.

Additional data beyond the VM configuration and vDisk data might be saved (step 608) to persistent storage. For example, any files that are open by the hypervisor might be closed so as to flush buffers out to persistent storage. As another example, various acts of taking large snapshots might be curtailed to give processing priority to any smaller, incremental snapshots that might be able to be completed quickly.

After the VMs have all quiesced, and after the hypervisor processing has been sufficiently suspended so as to bring the hypervisor to a quiesced hypervisor state, and after the persistent data has been saved to offline storage, then each hypervisor at each node can be hibernated (step 610). Also, after each hypervisor at each node is hibernated, the hypervisor (i.e., running from in-memory instructions) or operating system kernel can (1) save a footprint of the hardware configuration (for use in the restoration process) and (2) clone the boot devices (step 612), after which time the operating system can uncouple from all real hardware devices. At this point, the virtual node is quiesced and all needed data, including cookies, footprints, and images of the boot devices have been saved to offline storage. Various characteristics of the boot device layout are now briefly discussed.

Figures 6B, 6C:
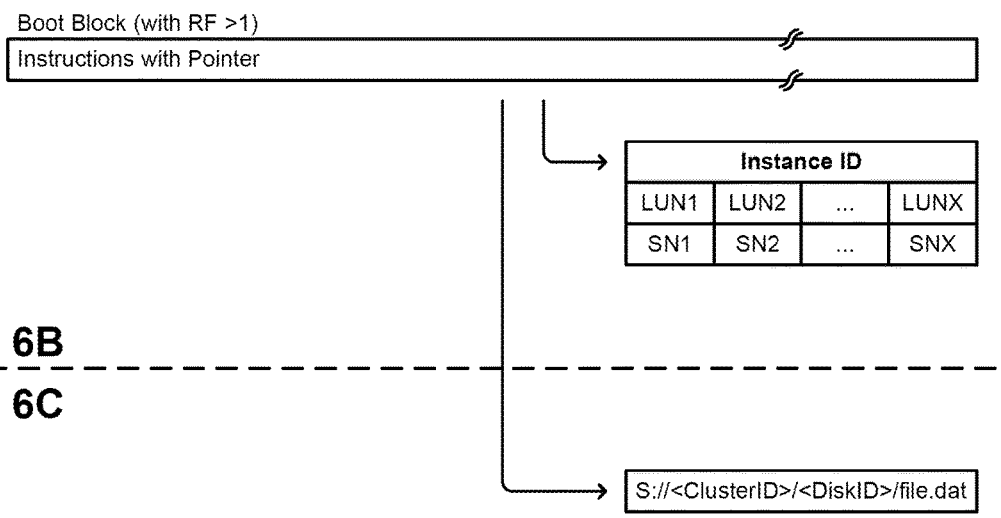
FIG. 6B and FIG. 6C present a virtual boot block layout for use with hypervisor hibernation techniques, according to an embodiment.

FIG. 6B and FIG. 6C present a virtual boot block layout for use with hypervisor hibernation techniques. One possible layout includes a boot block with just a few executable instructions or commands, and a few pointers. For bring-up of a virtual cluster, there is one boot block per virtual node (though there may be multiple copies of the boot block for purposes of resilience). Each boot block belonging to a virtual node is indexed such that the boot block that was cloned before the hibernation can be retrieved by index when the virtual node is brought up on the replacement hardware.

Additionally or alternatively, an agent or call to an agent can be integrated into the BIOS of the node (e.g., the replacement node) such that the operating system image selection, location, etc. can be determined from the boot block. Additionally, the boot block might be configured with a pointer to a table that identifies all devices (e.g., disk devices having individual unique serial numbers such as SN1, SN2, . . . SNX) and/or LUN identifiers (e.g., LUN1, LUN2, . . . LUNX, etc.) that were present at the time that the virtual cluster was hibernated. It can happen that the device identification and/or LUNs are different at the replacement nodes, and in such a case, the hypervisor will recognize this is the case and reconcile. Additionally, the boot block might be configured with a pointer to a table that identifies all network devices (e.g., ethernet interfaces) and/or sockets that were present at the time that the virtual cluster was hibernated. It can happen that the network devices and/or sockets are missing or invalid at the replacement nodes, and in such a case, the hypervisor will recognize this is the case and reconcile. Additionally, the boot block may comprise a pointer to a "cloud-init" or similar file (e.g., the shown "file.dat" file) that can be used in the aforementioned reconciliation. Such a file can be accessed by an http call once certain portions of the operating system are installed and configured at the replacement node. Additional information such as the version of the operating system can also be stored in the boot block. The foregoing boot blocks and the contents of any data that is pointed to by the boot blocks are used in restoration of a virtual node at a replacement hardware node.

Figure 6D:
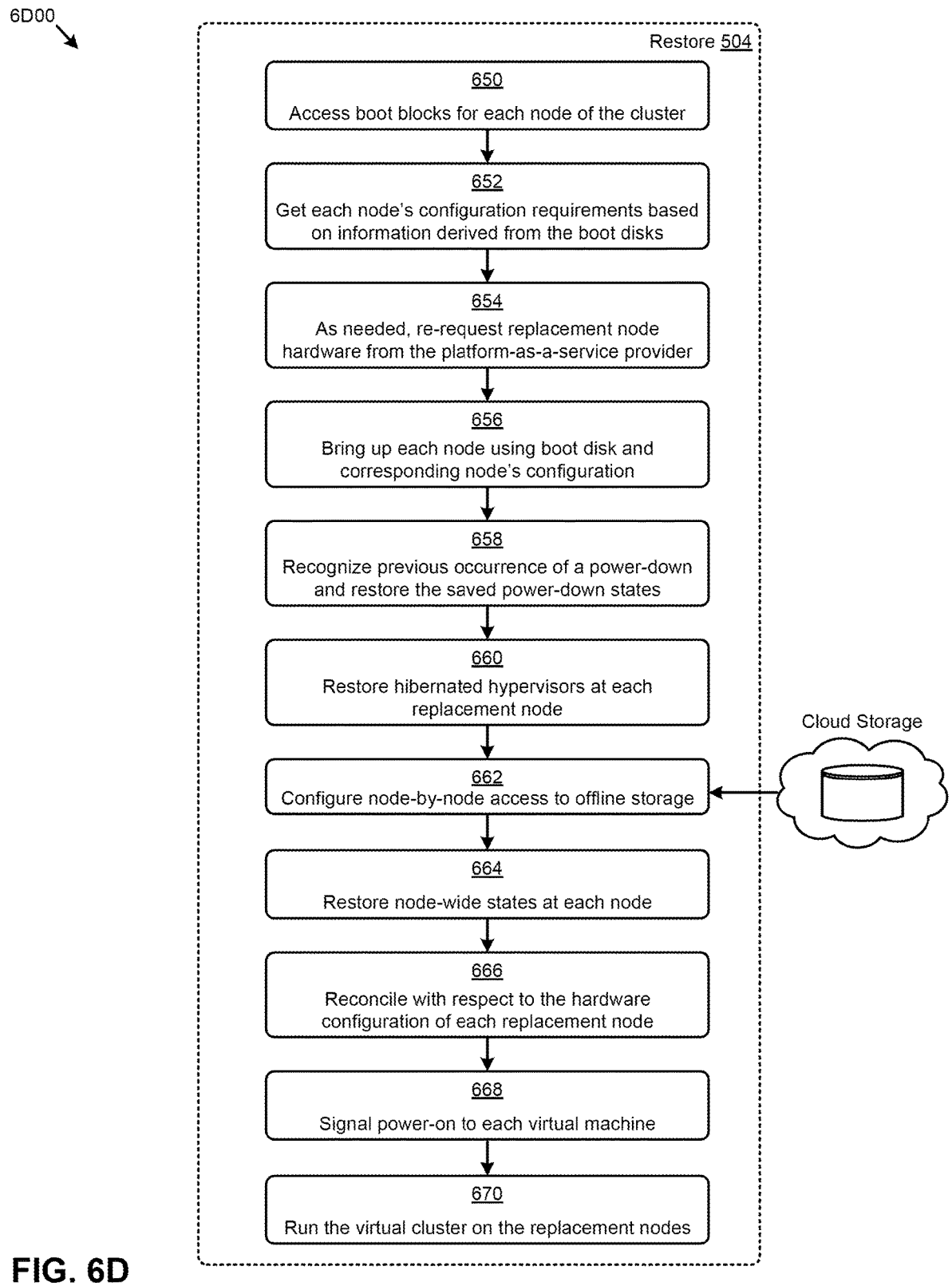
FIG. 6D presents a cluster-wide migration flow using hypervisor restore techniques, according to an embodiment.

FIG. 6D presents a cluster-wide migration flow 6D00 using hypervisor restore techniques. Referring again to acts pertaining to the cluster-wide restore 504 of FIG. 5C, each of the replacement nodes are associated with a boot device and corresponding boot block. Upon an event (e.g., an event raised by the platform-as-a-service provider), each of the replacement nodes accesses its respective boot device or boot block (step 650) and begins to execute instructions or commands from the boot device or boot block. This execution of instructions or commands constitutes the beginning of the bring-up. The bring-up includes having each node determine its own configuration (step 652). The determined configuration is compared to the footprint of the hardware configuration that was saved during the save procedure (referring again to step 612). If the comparison of the two hardware footprints is deemed incompatible, then the boot-up procedure will again request (e.g., via an API) replacement hardware from the platform-as-as-service provider (step 654). When each replacement node is sufficiently compatible with the node that was migrated from, then bring-up can commence in earnest (step 656). A bring-up agent will recognize that a particular occurrence of a bring-up is in response to a previous power down event (step 658) and, responsive to that determination, the bring-up agent will access the saved power down configuration. Even though there may be some differences in the hardware footprints between the migrated from node and the replacement node, to the extent possible the configuration of the migrated-from node is applied at the replacement node. Strictly as one example, the configuration of the migrated-from node might include bring-up of the same operating system version at the replacement node as was present at the migrated-from node at the time of the power down.

Having progressed through bring-up of the host operating system, the hibernated hypervisors at each replacement node of the virtual cluster can be restored (step 660). Each newly-restored hypervisor can then configure access to offline storage (step 662). Upon retrieval of saved state information by each of the virtual nodes of the virtual cluster, each virtual node's state can be restored (step 664).

In addition to the footprint-to-footprint compatibility checks (step 652), further checks and reconciliation is performed by each hypervisor (step 666). For example, the LUNs and/or corresponding disk serial numbers, and/or networking interface devices, and/or GPU identifiers (e.g., GPU1), etc. may be different between the footprint information saved by each of the virtual nodes and the footprint of the replacement node.

After reconciliation, each VM can be powered on (step 668). The virtual cluster runs on the replacement nodes (step 670).

The foregoing description pertains to save and restore operations that were precipitated by occurrence of a service interval event from a platform-as-a-service provider. There are however other reasons why a virtual cluster might be saved and restored. Strictly as an example, a virtual cluster might be migrated from a first public cloud to a second public cloud. As another example, a virtual cluster might be migrated from an on-prem setting to a pubic cloud, etc. Furthermore, a virtual cluster might carry out storage operations over a shared data store using a virtualized controller that executes at each node of the cluster. Various embodiments of such a virtualized controller are shown and described as pertains to FIG. 7A, FIG. 7B, and FIG. 7C.

Figure 7A:
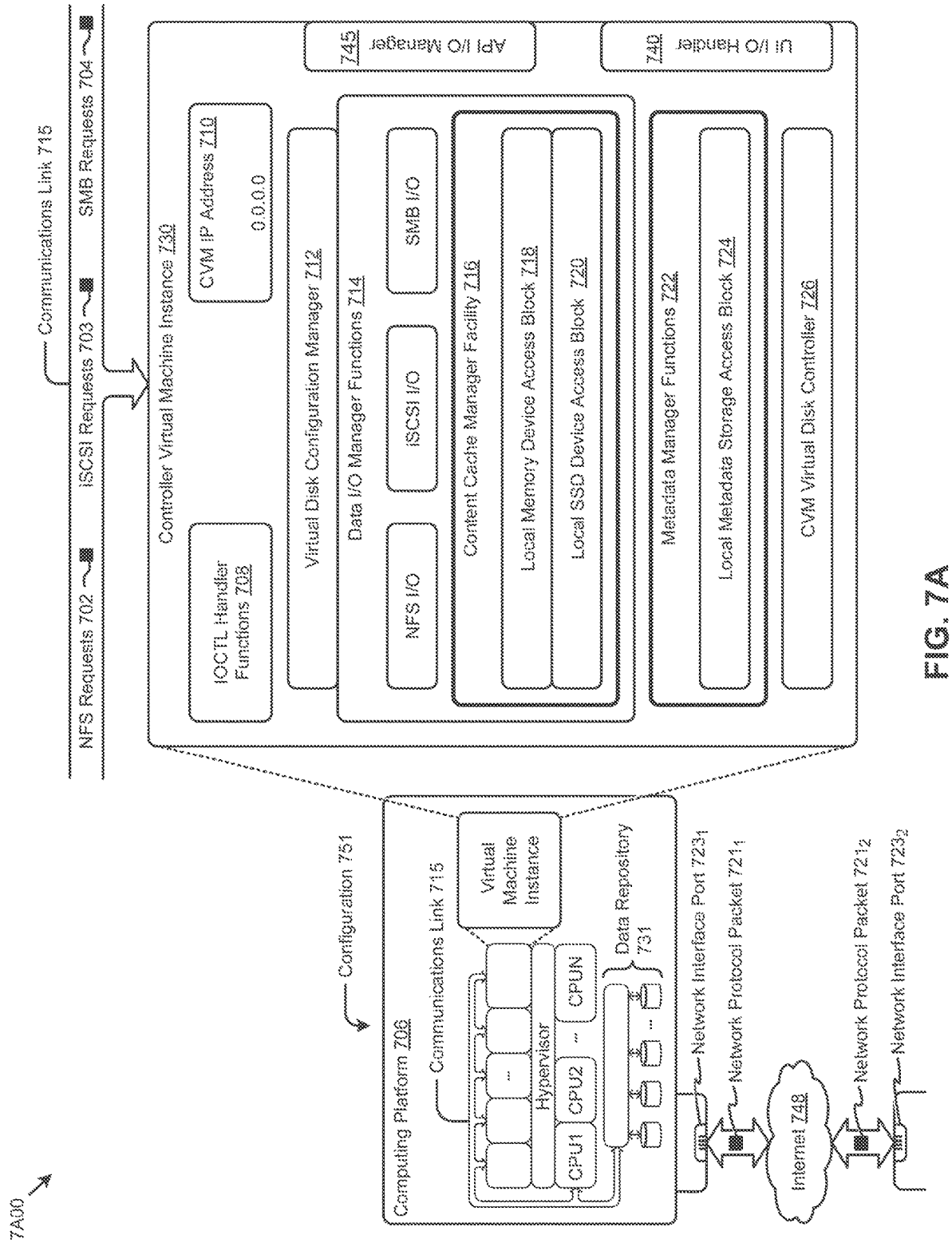
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 723₁ and network interface port 723₂). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 721₁ and network protocol packet 721₂).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 72 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to implementing hypervisor hibernation. In some embodiments, a module may include one or more state machines and/or combinational logic used to implement or facilitate the operational and/or performance characteristics pertaining to implementing hypervisor hibernation.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of hypervisor hibernation). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to hypervisor hibernation, and/or for improving the way data is manipulated when performing computerized operations pertaining to hibernating a hypervisor and its virtual machines before moving the virtual machine and its hypervisor states to a different host computing system configuration.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
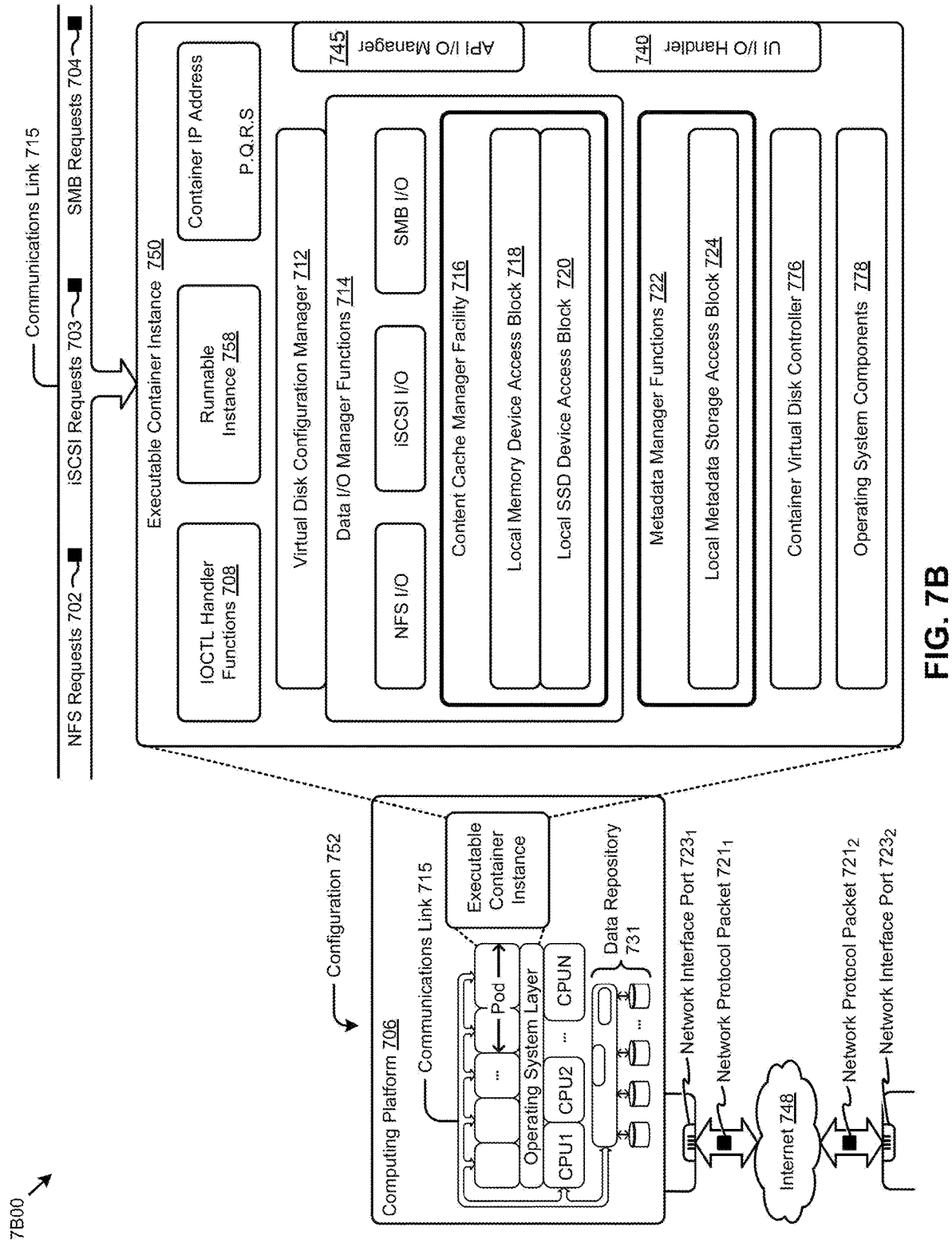

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
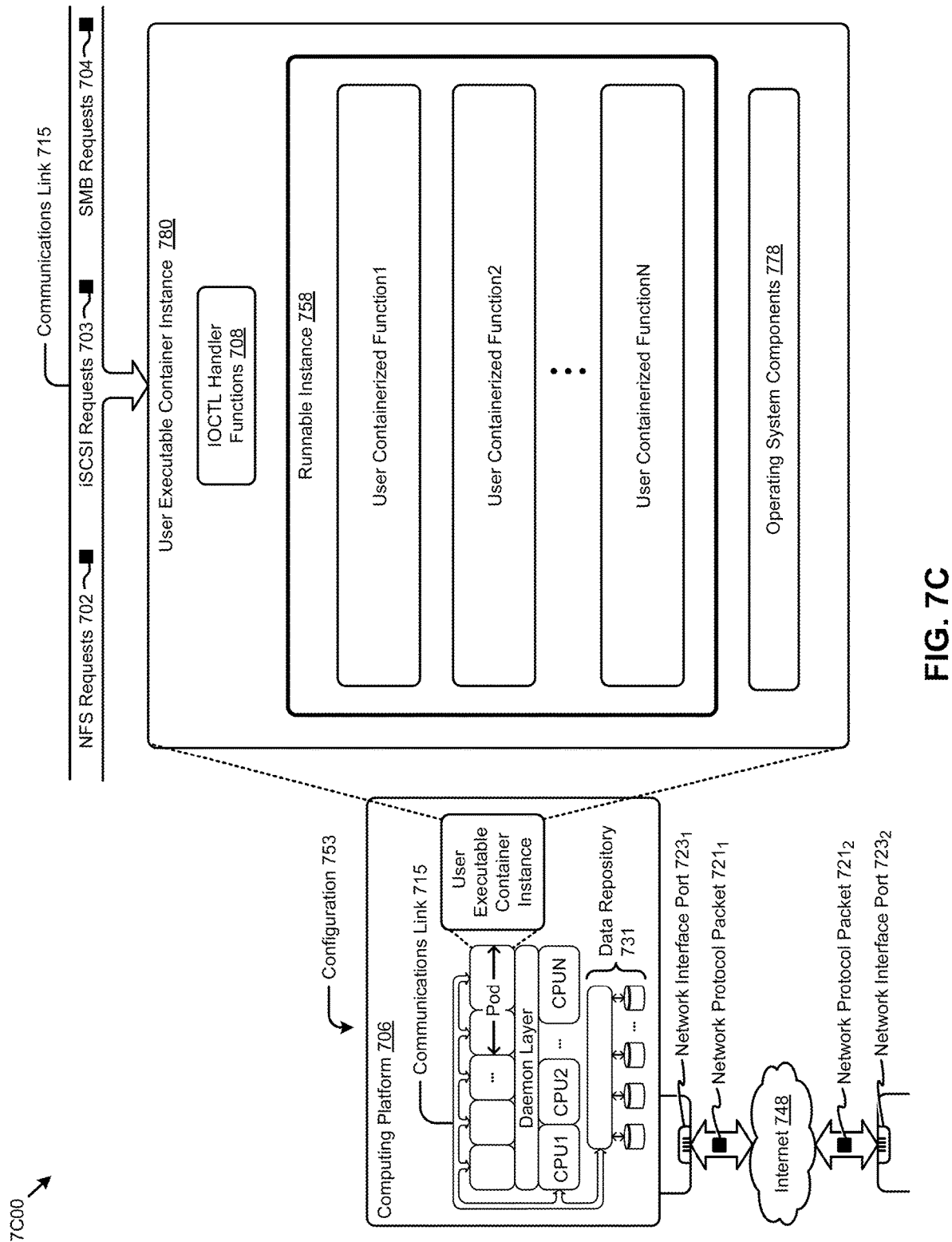

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause a set of acts for migrating configurations of virtualization environments between cloud environments, the set of acts comprising:
   identifying a virtualization environment to be migrated from a first cloud environment to a second cloud environment;
   copying the virtualization environment from the first cloud environment to the second cloud environment, wherein the virtualization environment includes multiple hypervisors, a virtualized process on at least one of the multiple hypervisors, and wherein individual hypervisors of the multiple hypervisors are on respective nodes of multiple nodes; and
   using a logical to physical map to specify how a logical resource parameter of the virtualization environment is mapped to a physical resource parameter of the virtualization environment.

2. The non-transitory computer readable medium of claim 1, wherein the first cloud environment comprises a first private cloud or a first public cloud and the second cloud environment comprises a second private cloud or a second public cloud.

3. The non-transitory computer readable medium of claim 2, wherein the first private cloud or the second private cloud is on-premises.

4. The non-transitory computer readable medium of claim 1, wherein in the first cloud environment comprises a private cloud and the second cloud environment comprises a public cloud.

5. The non-transitory computer readable medium of claim 1, wherein a configuration and resource state of a first individual hypervisor of a first type on the first cloud environment is restored to a second individual hypervisor of a second type different from the first type in the second cloud environment.

6. The non-transitory computer readable medium of claim 2, wherein the virtualization environment comprises a first hypervisor on a first node and a second hypervisor on a second node, each of the first and second hypervisors having one or more virtualized processes.

7. The non-transitory computer readable medium of claim 1, wherein the multiple hypervisors on physical hardware of a node.

8. The non-transitory computer readable medium of claim 1, wherein a first individual hypervisor of the multiple hypervisors in the first cloud environment runs on first physical hardware of a first node, the first individual hypervisor in the second cloud environment runs on second physical hardware of a second node, and the first physical hardware is different from the second physical hardware.

9. A method for migrating configurations of virtualization environments between cloud environments, the method comprising:
   identifying a virtualization environment to be migrated from a first cloud environment to a second cloud environment;
   copying the virtualization environment from the first cloud environment to the second cloud environment, wherein the virtualization environment includes multiple hypervisors a virtualized process on at least one of the multiple hypervisors, and wherein individual hypervisors of the multiple hypervisors are on respective nodes of multiple nodes; and
   using a logical to physical map to specify how a logical resource parameter of the virtualization environment is mapped to a physical resource parameter of the virtualization environment.

10. The method of claim 9, wherein the first cloud environment comprises a first private cloud or a first public cloud and the second cloud environment comprises a second private cloud or a second public cloud.

11. The method of claim 10, wherein the first private cloud or the second private cloud is on-premises.

12. The method of claim 9, wherein in the first cloud environment comprises a private cloud and the second cloud environment comprises a public cloud.

13. The method of claim 9, wherein a configuration and resource state of a first individual hypervisor of a first type on the first cloud environment is restored to a second individual hypervisor of a second type different from the first type in the second cloud environment.

14. The method of claim 9, wherein the virtualization environment comprises a first hypervisor on a first node and a second hypervisor on a second node, each of the first and second hypervisors having one or more virtualized processes.

15. The method of claim 9, wherein the multiple hypervisors on physical hardware of a node.

16. The method of claim 9, wherein a first individual hypervisor of the multiple hypervisors in the first cloud environment runs on first physical hardware of a first node, the first individual hypervisor in the second cloud environment runs on second physical hardware of a second node, and the first physical hardware is different from the second physical hardware.

17. A system for migrating configurations of virtualization environments between cloud environments, the system comprising:
   a storage medium having stored thereon a sequence of instructions; and
   a processor that executes the sequence of instructions to cause a set of acts comprising,
   identifying a virtualization environment to be migrated to from a first cloud environment to a second cloud environment;
   copying a configuration of the virtualization environment from the first cloud environment to the second cloud environment, wherein the virtualization environment includes hypervisor and a virtualized process on the hypervisor; and
   using a set of logical to physical maps to specify how a logical resource parameter of the virtualization environment is mapped to a physical resource parameter of the virtualization environment;
   copying the virtualization environment from the first cloud environment to the second cloud environment, wherein the virtualization environment includes multiple hypervisors a virtualized process on at least one of the multiple hypervisors, and wherein individual hypervisors of the multiple hypervisors are on respective nodes of multiple nodes; and
   using a logical to physical map to specify how a logical resource parameter of the virtualization environment is mapped to a physical resource parameter of the virtualization environment.

18. The system of claim 17, wherein the first cloud environment comprises a first private cloud or a first public cloud and the second cloud environment comprises a second private cloud or a second public cloud.

19. The system of claim 18, wherein the first private cloud or the second private cloud is on-premises.

20. The system of claim 17, wherein in the first cloud environment comprises a private cloud and the second cloud environment comprises a public cloud.

21. The system of claim 17, wherein a configuration and resource state of a first individual hypervisor of a first type on the first cloud environment is restored to a second individual hypervisor of a second type different from the first type in the second cloud environment.

22. The system of claim 17, wherein the virtualization environment comprises a first hypervisor on a first node and a second hypervisor on a second node, each of the first and second hypervisors having one or more virtualized processes.

23. The system of claim 17, wherein the multiple hypervisors on physical hardware of a node.

24. The system of claim 17, wherein a first individual hypervisor of the multiple hypervisors in the first cloud environment runs on first physical hardware of a first node, the first individual hypervisor in the second cloud environment runs on second physical hardware of a second node, and the first physical hardware is different from the second physical hardware.

* * * * *